United States Patent
Imaizumi et al.

(10) Patent No.: US 7,465,481 B2
(45) Date of Patent: Dec. 16, 2008

(54) EXTERIOR MOLDING BODY COMPRISING A LONG FIBER REINFORCED THERMOPLASTIC RESIN

(75) Inventors: Hiroyuki Imaizumi, Hiratsuka (JP); Motonori Ueda, Hiratsuka (JP); Kouji Nishida, Hiratsuka (JP); Kei Morimoto, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 11/662,518

(22) PCT Filed: Sep. 7, 2005

(86) PCT No.: PCT/JP2005/016413

§ 371 (c)(1),
(2), (4) Date: Jun. 20, 2007

(87) PCT Pub. No.: WO2006/030673

PCT Pub. Date: Mar. 23, 2006

(65) Prior Publication Data

US 2007/0243343 A1 Oct. 18, 2007

(30) Foreign Application Priority Data

Sep. 14, 2004 (JP) ............................. 2004-267154
Sep. 14, 2004 (JP) ............................. 2004-267155

(51) Int. Cl.
*B32B 21/00* (2006.01)

(52) U.S. Cl. .................. 428/34.5; 428/35.7; 428/293.4; 428/474.4; 264/40.1; 264/513; 264/572; 264/555

(58) Field of Classification Search ................ 428/34.5, 428/35.7, 293.4, 474.4; 264/40.1, 513, 555, 264/572

See application file for complete search history.

(56) References Cited

U.S. PATENT DOCUMENTS

| 4,801,186 A | * | 1/1989 | Wagatsuma et al. | .......... 385/128 |
| 5,522,719 A | * | 6/1996 | Umeda et al. | ................ 425/380 |
| 6,244,653 B1 | * | 6/2001 | Nishio et al. | ........... 296/216.09 |
| 6,866,811 B2 | * | 3/2005 | Kayano et al. | .............. 264/513 |

FOREIGN PATENT DOCUMENTS

| JP | 6-143331 A | * | 5/1994 |
| JP | 8-132478 A | | 5/1996 |
| JP | 2002-105343 A | * | 4/2002 |
| JP | 2002-105343 A | | 4/2002 |
| JP | 2002-326331 A | | 11/2002 |
| JP | 2004-209773 A | | 7/2004 |

OTHER PUBLICATIONS

International Search Report for PCT/JP2005/016413 mailed Oct. 25, 2005.

* cited by examiner

*Primary Examiner*—Kilima Leszek
(74) *Attorney, Agent, or Firm*—Nixon & Vanderhye P.C.

(57) ABSTRACT

The object the present invention is to provide an exterior molding body for automobile which is reinforced by a long fiber, is excellent in mechanical properties such as bending elastic modulus and bending strength, chemical resistance and heat resistance, is lightened, has high designability and is reduced in the anisotropy of linear expansion coefficient of molding body caused by the fiber orientation at filling thereof to a mold.

15 Claims, 8 Drawing Sheets

PLANER VIEW

SIDE VIEW

PLANER VIEW

A-AA SIDE VIEW

PLANER VIEW

A-AA SIDE VIEW

PLANER VIEW

A-AA SIDE VIEW

PLANER VIEW

SIDE VIEW

PLANER VIEW

A-AA SIDE VIEW

PLANER VIEW

A-AA SIDE VIEW

PLANER VIEW

A-AA SIDE VIEW

EXTERIOR MOLDING BODY COMPRISING A LONG FIBER REINFORCED THERMOPLASTIC RESIN

This application is a U.S. national phase of International Application No. PCT/JP2005/16413 filed 7 Sep. 2005, which designated the U.S. and claims priority to JP 2004-267154 filed 14 Sep. 2004, and JP 2004-267155 filed 14 Sep. 2004, the entire contents of each of which are hereby incorporated by reference.

TECHNICAL FIELD OF THE INVENTION

The present invention relates to an injection molding product of a long fiber reinforced thermoplastic resin excellent in mechanical properties such as impact resistance and fluidity. Further, it relates to an exterior molding body comprising a long fiber reinforced thermoplastic resin, especially an exterior molding body for automobile, which overcomes a problem of anisotropic of molding product generated by fiber orientation at the injection molding.

BACKGROUND OF THE INVENTION

Generally, as an exterior molding body of automobile, there us used a metallic exterior panel attached on a metallic structural part. However, recently, in order to improve a mileage and running performance of automobile, there has been a demand to lighten various automobile parts and therefore there has been used a resin for the exterior panel and support structure therefor.

For example, in Patent Document 1, in order to lighten the panel for automobile, there has been a proposal of a panel for automobile comprising a fiber reinforced plastic (FRP) whose reinforced fiber is a base fabric comprising continuous fiber. However, this is not satisfactory for designability and production efficiency.

Further, in Patent Document 2, there has been a proposal of a tailgate comprising an outer panel comprising a polyphenylene ether/polyamide alloy and an inner panel comprising a long fiber reinforced polyamide/polyolefin alloy in view of lightening and modulation thereof. However, this proposal has a problem of not good setting and waving appearance by dimension change of polyamide (PA) by water absorption. In order to solve the problem of the dimension change by water absorption, there has been a proposal of using a polycarbonate/polybutylene terephthalate alloy. However, an adhesion constitution is required because the inner panel comprises a long fiber reinforced polypropylene. Further, the outer panel is affected by an anisotropy of linear expansion by the fiber orientation in the inner panel. However, there is no description for the magnification and anisotropy of linear expansion.

In Patent Document 3, there has been proposed a carbon fiber reinforced polyamide for exterior parts of vehicles having an average value of $6\times10^{-5}K^{-1}$ between a linear expansion coefficient in the flow direction and a linear expansion coefficient in the right angle direction to the flow direction at the injection molding. However, there is no description of anisotropic. In case of having large anisotropic, the degree of dimension change by change of temperature is different in the any directions. Therefore, the appearance quality is affected thereby and there is a possibility that breakage and cracking of molding parts occur by the presence of stress concentration parts, accordingly it is not preferable.

Further, in Patent Document 4, there is a description that in a thermoplastic resin molding body obtained by injection molding a fiber reinforced thermoplastic resin containing 3 to 70% by weight of a fibrous reinforcing material and having such a property that (volume)/(surface area)<2 mm, the relationship of linear expansion coefficients in the flow direction (MD) of melt resin containing fibrous reinforcing material and in the right angle direction (TD) to the flow direction at 23 to 100° C. is 0.6<(coefficient in the TD direction)/(coefficient in the MD direction)<2.5. Surely, it is required in the exterior structure for automobile to reduce the anisotropic. However, if the absolute value of linear expansion coefficient is still large, there is a possibility of deterioration of setting performance, not good effect for the around parts and deterioration of appearance quality such as not good painting and cracking of paint by linear expansion. Further, in case where in the molding, there is a part having a small cross section area molded at the narrow flow path, the fiber orientation is remarkable and the anisotropy thereof is remarkable, whereby there is a possibility of any not good effect for the entirely molding product case by case of the length of narrow flow path. However, in the document, there is no description for the shape of molding body.

Patent Document 1: Japanese Patent Application Laid-Open (KOKAI) No. 2002-127944

Patent Document 2: Japanese Patent Application Laid-Open (KOKAI) No. 2003-118379

Patent Document 3: Japanese Patent Application Laid-Open (KOKAI) No. 2002-226703

Patent Document 4: Japanese Patent Application Laid-Open (KOKAI) No. 9-296053

DISCLOSURE OF THE INVENTION

Problem to be Solved by the Invention

The object to be solved by the present invention is to provide an exterior molding body for automobile which is reinforced by a long fiber, is excellent in mechanical properties such as bending elastic modulus and bending strength, chemical resistance and heat resistance, is lightened, has high designability and is reduced in the anisotropy of linear expansion coefficient of molding body caused by the fiber orientation at filling thereof to a mold.

Means for Solving Problem

As a result of the present inventors' earnest study to solve the above subject, it has been found that by specifically defining the resin flow path in the mold cavity at the molding, maximum linear expansion coefficient by the fiber orientation of long fiber reinforced exterior molding body for automobile, anisotropy of linear expansion coefficient thereof and maximum dimension change percentage at the water absorption can be reduced. The present invention has been attained on the basis of the above finding.

In an aspect of the present invention, there is provided an exterior molding body comprising a long fiber reinforced thermoplastic resin having such properties that:

the content of long fiber dispersed in the molding body is 30 to 90% by weight, the average fiber length of long fiber is 1.5 to 10 mm, the maximum project area of said molding body is not less than 20000 mm$^2$, the molding body has such a shape that the length of narrow resin flow path at the portion having not more than 100 mm$^2$ of cross sectional area in the mold cavity at the molding is not more than 150 mm, the maximum linear expansion coefficient at a portion of said molding body having a wall thickness of not less than 2 mm is not more than $5 \times 10^{-5} K^{-1}$ and the ratio of maximum linear expansion coefficient/minimum linear expansion coefficient is not more than 1.8.

Effect of the Invention

The exterior molding body comprising a long fiber reinforced thermoplastic resin according to the present invention has such properties that the content of long fiber dispersed in the molding body is 30 to 90% by weight, a long fiber having the average fiber length of 1.5 to 15 mm is used and the molding body has such a shape that the length of narrow resin flow path at the portion having not more than 100 mm² of cross sectional area in the mold cavity at the molding is not more than 150 mm. Therefore, it is excellent in dimension stability by reducing the linear expansion coefficient and anisotropy thereof, as well as excellent in mechanical strength such as bending elastic modulus and bending strength, chemical resistance and heat resistance, is lightened, has high product designability and is used for production of large-scale molding body suitable for the exterior molded body for automobile

PREFERRED EMBODIMENTS FOR CARRYING OUT THE INVENTION

Figure 1:
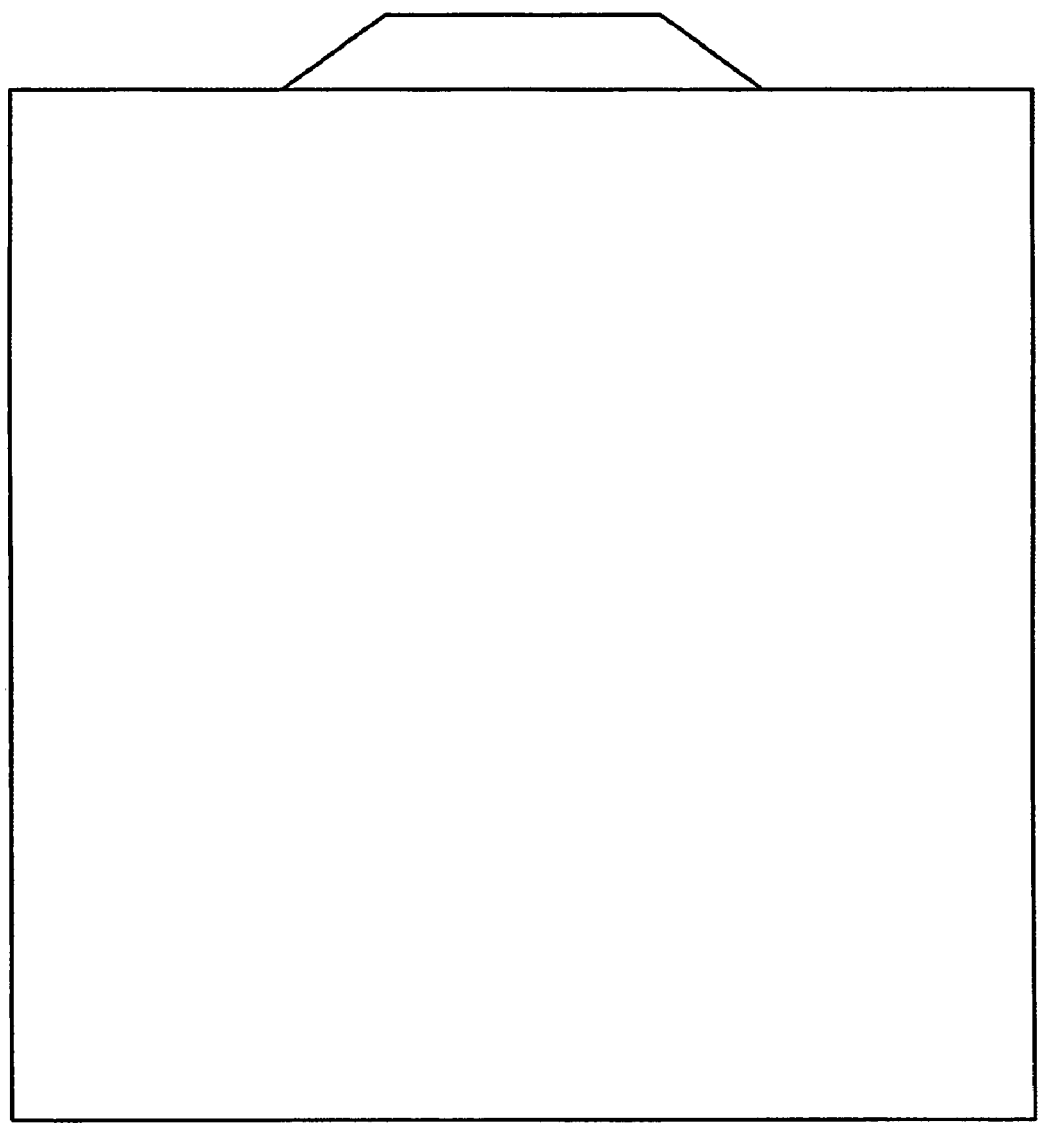
FIG. 1 is planer views and side views of exterior molding bodies obtained in Examples 1, 2 and 4 and Comparative Examples 1, 2 and 5.
Figure 1:

The present invention is explained in detail below. The exterior molding body comprising a long fiber reinforced thermoplastic resin according to the present invention (hereinafter, abbreviated as "present molding body") is suitable for a large-scale molding body in which the effect by anisotropy of linear expansion coefficient is remarkable, and is a molding body whose maximum project area is not less than 20000 mm². In case of molding using a fiber reinforced resin, it is generally thought that in the surface layer of a thick wall product, the fiber contained therein is oriented to the resin flow direction, in the core layer of the thick wall product, the fiber contained therein is oriented to the right angle direction to the resin flow direction. In case where the fiber for reinforcing is a short fiber, since the variety of movement (rotation) of fiber at the molding is enhanced, in many cases, the fiber in the surface layer is oriented to resin flow direction by the shear strength from the molding cavity wall, on the other hand, the fiber near the core layer is oriented to random directions. In case where the fiber for reinforcing is a long fiber, it is thought that since the variety of movement (rotation) of fiber at the molding is reduced by the effect of fiber length, the fiber in the surface layer is oriented to resin flow direction, on the other hand, the fiber near the core layer is oriented to the right angle direction to the resin flow direction, that is, the fiber tend to be oriented to clear directions. Incidentally, the upper limit of maximum project area of molding body is usually 2 m² (2000000 mm²).

The other feature of molding body according to the present invention is a relationship between the cross sectional area at the narrow flow path in the mold and the flow length at the narrow flow path in the mold at the molding, that is, such a relationship that preferably the flow length at the narrow flow path having a cross sectional area of not more than 100 mm² is not more than 150 mm, more preferably the flow length at the narrow flow path having a cross sectional area of not more than 80 mm² is not more than 100 mm. If the flow length at the narrow flow path having a cross sectional area of not more than 100 mm² at the molding is more than 150 mm, there tends that regarding the orientation direction of fiber for reinforcing, fibers oriented to the feed direction of melted resin are increased so that the linear expansion coefficient in the feed direction of melted resin is effectively reduced, however the effect thereby to the right angle direction to the feed direction of melted resin is weaken so that the anisotropy is enhanced. In case where the anisotropy is enhanced, there are possibilities of not good effect for construction putting properties and engagement and gap size to surrounding parts which are required in exterior parts, and deterioration of appearance quality such as painting troubles and paint cracks by linear expansion.

Further, the exterior molding body has such properties that the content of long fiber dispersed in the molding body is 30 to 90% by weight; the average fiber length of long fiber dispersed therein is 1.5 to 10 mm; when linear expansion coefficients at the optional portions (many portions) of molding body having a wall thickness of not less than 2 mm are measured at 23 to 80° C. and the maximum value in the measured values (maximum linear expansion coefficient) is not more than $5 \times 10^{-5} K^{-1}$; and when calculating the ratio of maximum linear expansion coefficient to the minimum measured value (minimum linear expansion coefficient), the ratio of maximum linear expansion coefficient/minimum linear expansion coefficient is not more than 1.8.

When the content of long fiber dispersed in the molding body is less than 30% by weight or the average fiber length of long fiber dispersed therein is less than 1.5 mm, the mechanical properties such as bending elastic modulus and dimension stability are deteriorated and this is not preferable. When the content of long fiber dispersed in the molding body is more than 90% by weight or the average fiber length of long fiber dispersed therein is more than 10 mm, the moldability is deteriorated and this is not preferable. When the maximum linear expansion coefficient is more than $5 \times 10^{-5} K^{-1}$ and when the ratio of maximum linear expansion coefficient/minimum linear expansion coefficient is more than 1.8, total deformation degree of molding body by temperature change and there are possibilities of not good effect for construction putting properties and engagement and gap size to surrounding parts which are required in exterior parts, generation of cracking by deformation thereof, distortion of appearance and deterioration of appearance quality such as painting troubles and paint cracks by the linear expansion at painting the molding body, and these are not preferable.

The long fiber for reinforcing constituting the molding body according to the present invention are not limited as long as the average fiber length thereof is 1.5 to 10 mm, preferably 2 to 7 mm for obtaining a structure having more excellent mechanical properties and dimension stability and it is possible to disperse in the molding body. Usually, there can be used glass fibers, carbon fibers, metal fibers, synthetic fibers, etc. which are used for reinforcing resins. Of these, glass fibers and carbon fibers are practical. The diameter of carbon fiber is preferably 5 to 15 μm. Further, in order to enhance an interfacial adhesion between the fiber for reinforcing and the thermoplastic resin, it is preferred to use a fiber for reinforcing which are subjected to surface treatment with a sizing agent or a surface-treating agent such as epoxy-based compounds, acryl-based compounds, isocyanate-based compounds, silane-based compounds and titanate-based compounds.

In case where the long fiber for reinforcing constituting the molding body according to the present invention is a glass fiber, it is preferred to use a glass fiber having a diameter of 10 to 20 μm in view of preventing from breakage of glass fiber and more enhancing the properties balance. As examples of practical used glass fiber, there are mentioned glass fibers comprising a glass composition such as A glass, C glass and E glass, preferably E glass (non-alkali glass) in view of no adverse effect for the thermal stability of thermoplastic resin. As a production method of glass fiber, there may be exemplified a method comprising first molding a melted glass to form a marble which is a glass ball having a prescribed size; heating and softening it in a pushing which is a furnace for taking a glass yarn; dropping the softened glass from many nozzles of a table in the furnace to form a glass yarn material; during high-speed stretching, sizing it by immersing it with a sizing agent in an equipment for coating the sizing agent, which is provided on the way of stretching; drying it; and winding it by a rotary drum. The average diameter of glass fiber is controlled to a prescribed size by controlling conditions such as the nozzle diameter size, withdrawing speed and temperature at the withdrawing atmosphere.

In case where the long fiber for reinforcing constituting the molding body according to the present invention is a carbon fiber, it is preferred to use a glass fiber having a diameter of 5 to 15 μm in view of preventing from breakage of carbon fiber and more enhancing the properties balance.

As practical used carbon fibers, generally, there are mentioned carbon fibers produced by calcining a material such as acrylic fibers, specific petroleum or carbon-based pitchs, cellulose fibers and lignin, and there are many types thereof such as a flame resistance type, carbonaceous type and graphite type but there is no limitation to a specific one therein.

As the especially preferred examples of thermoplastic resin constituting the molding body according to the present invention, there are mentioned one selected from polyesters such as polybutylene terephthalate and polyethylene terephthalate, aromaric polycarbonates, and alloys of these such as polyester/aromaric polycarbonate alloys in view of excellent mechanical strength, oil resistance, chemical resistance, heat resistance, durability, moldability, dimension stability to water absorption, impact resistance at high temperature, fatigue properties and creep properties. Further, as the polyester resins, such a polybutylene terephthlate resin that the intrinsic viscosity thereof measured at 30° C. in a mixed solvent of phenol and tetrachloroethane in a ratio of 1:1 by weight is 0.30 to 1.20 dl/g and the titanium content thereof is not more than 50 ppm, preferably 33 ppm based on titanium metal weight in the resin is preferred in view of deterioration of mechanical strength by breakage of reinforced fiber and hydrolysis resistant property. When the intrinsic viscosity of polybutylene terephthlate is less than 0.30 dl/g, mechanical properties of base resin constituting the matrix of long fiber reinforced resin may be deteriorated and mechanical properties required in the exterior molding body comprising long fiber reinforced resin may not be satisfied. When the intrinsic viscosity of polybutylene terephthlate constituting the molding body is more than 1.20 dl/g, since too high viscosity of base resin constituting the matrix of long fiber reinforced resin, moldability thereof is deteriorated and the breakage of long fiber in the molding process is increased thereby caused to deterioration of mechanical strength, therefore, this is not preferred. Further, in order to prevent polybutylene terephthlate constituting the matrix of long fiber reinforced resin from deterioration of mechanical strength by hydrolysis, the titanium content thereof is preferably 33 ppm.

As the other especially preferred examples of thermoplastic resin constituting the molding body according to the present invention, there are mentioned polyamide resins. Polyamide resins are widely used in many fields such as automobile fields, electric fields and electronic fields because of their excellent properties such as heat resistance, strength, oil resistance, gasoline resistance, friction resistance and moldability. Especially, in the automobile fields, there are many practical results as parts around an engine typically by making the best use of excellent heat resistance and oil resistance.

As the polyamide resin, there can be used various polymer and copolymer obtained by polymerization or polycondensation of ω-amino acid or lactam thereof, of polycondensation of diamine and carboxylic acid. Concretely, there are exemplified polymers of α-pyrrolidone, α-piperidone, ε-caprolactam, aminocaproic acid, enantholactam, 7-aminoheptanoic acid, 8-aminooctanoic acid, 9-aminononanoic acid, 11-amicoundecanoic acid and 12-aminododecanoic acid, polymers or copolymers obtained by polycodensation of diamines such as hexamethylene diamine, nonmethylene diamine, undecamethylene diamine, dodecamethylene diamine and methxylilene diamine, and dicarboxylic acids such as terephthalic acid, isophthlic acid, glutaric acid, adipic acid, azelaic acid sebacic acid, undecanoic diacid and dodecanoic diacid. As the concrete examples of polymers or copolymers, there are mentioned polyamide 4, polyamide 6, polyamide 7, polyamide 8, polyamide 11, polyamide 12, polyamide 6-6, polyamide 6-9, polyamide 6-10, polyamide 6-11, polyamide 6-12, polyamide 6T, copolyamide 6/6-6, copolyamide 6/12, copolyamide 6/6T and polyamide 6I/6T. Of these, polyamide 6, polyamide 6-6, and copolyamide 6/6-6 are preferred, polyamide 6 is especially preferred. Also, aromatic polyamide resins whose main component is a polyamide obtained by polycondensation reaction of aromatic diamine and aliphatic dicarboxylic acid is preferred. As the aromatic diamine, there are exemplified paraxylilene diamine and methxylilene diamine, preferred is a mixture of paraxylilene diamine and methxylilene diamine. The reason for selecting the long fiber reinforced polyamide resin as the material of exterior molding body according to the present invention is that the long fiber reinforced polyamide resin is excellent in mechanical strength, oil resistance, chemical resistance, heat resistance, durability and moldability, especially excellent in impact resistance at high temperature, fatigue property and creep property in comparison with the long fiber reinforced thermoplastic resin such as polyester or the like.

The polyamide resin constituting the molding body according to the present invention preferably has a degree of polymerization in a specific range, namely a relative viscosity in a specific range. In case of polyamide 6, the relative viscosity measured at 23° C. in a 1% solution of 98% sulfuric acid is preferably 1.5 to 2.5, more preferably 1.7 to 2.4. When the relative viscosity is less than 1.5, the mechanical strength is low, and when the relative viscosity is more than 2.5, the fluidity is deteriorated and the breakage of long fiber in the molding process is increased thereby caused to deterioration of mechanical strength, and it is not preferred.

The molding body comprising the above polyamide resin according to the present invention preferably has such properties that the maximum dimension change rate under condition of moisture absorption at a portion of molding body having a thickness of not less than 2 mm is not more than 0.3%. This property can be easily evaluated by a method comprising 1) measuring the dimension change in the surface of molding body at the optional portions in the molding body having a thickness of not less than 2 mm (many portions), which dimension change is caused by the treatment of water absorption at the saturate absorption condition under 23° C. and 50% of relative humidity, 2) calculating the dimension change rate under condition of moisture absorption by the following formula using the measured values and 3) confirming the maximum value in the calculated values (maximum dimension change rate under condition of moisture absorption).

maximum dimension change rate under condition of moisture absorption=[(dimension after water absorption−dimension before water absorption)/dimension before water absorption]×100

When the maximum dimension change rate under condition of moisture absorption is more than 0.3%, there is a problem of construction putting trouble, effect for engagement and gap size to surrounding parts and poor waving appearance by dimension change by water absorption, therefore it is not preferred. Incidentally, there is no description for the dimension stability under moisture absorption in the above-mentioned prior arts.

The thermoplastic resin constituting the molding body according to the present invention is not specifically limited as long as a moldable resin. As the usable thermoplastic resins, in addition to the above-mentioned thermoplastic resins, there are exemplified olefin-based resins such as polyethylene and polypropylene; vinyl-based resins such as polyvinylchloride, polystyrene and acrylonitrile/styrene/butadiene copolymer; polyacetal resins; polymethylacrylate resin; polysulphone resins, polyphenyleneoxide resins. These may be used either alone or as a combination of two or more types.

The molding body according to the present invention is formed by molding as the molding material a mixture comprising the long fiber reinforced thermoplastic resin (A) or the long fiber reinforced thermoplastic resin (A) in which a recycled resin (B) is blended thereinto if required. As the molding method thereof, there are exemplified generally used methods for thermoplastic resin such as injection molding, injection compression molding, blow molding, extrusion molding, sheet molding, thermoforming, rotational molding, lamination molding, press molding, or the like. Of these, injection molding is especially preferred in view of appearance of molding body, designability and reducing the production steps. In the molding of the long fiber reinforced thermoplastic resin (A), usually, there is a possibility that the fiber length may be reduced by crushing the fiber for reinforcing at the stages of melt-kneading and filling into a mold. Therefore, in order to maintain the weight average fiber length of the fiber for reinforcing dispersed in the molding body to 1.5 to 10 mm, it is effective to control length of pellet, shape of inside wall of molding machine, shape of screw, molding conditions such as resin temperature at the molding and injection speed and mold shape including the above-mentioned narrow flow path. Also, an automobile front body structure having high rigidity and high strength can be obtained by providing boss and rib structures. Further, pressurized gas can be injected into the ribs and bosses. Still further, in order to further improve the rigidity strength, a movable portion is provided in a mold and pressurized gas is injected into a volume expanded portion to form a hollow part and to attain a cross sectional shape having high cross sectional rigidity. It is also possible that a foaming product or a metal having low melting point is filled into the formed hollow part and reinforced to attain further improvement of rigidity strength.

Further, if required, other components may be added into the long fiber reinforced thermoplastic resin (A) as the material of molding body according to the present invention. As the other components, there are exemplified compatibility improvers, stabilizers, flame retardants, weather resistance improvers, foaming agents, lubricants, fluidity improvers, impact resistance improvers, antistatic agents, dyes, pigments, dispersants, inorganic reinforcing agents, releasing agents, antioxidants, weather resistance improvers, alkaline soap, metal soap, hydrotalcites, plasticizers, nucleating agents, anti-dripping agents or the like. As the impact resistance improvers, there are exemplified polyolefin resins such as polyethylene and polypropylene, α-olefin-based rubbers, styrene-based rubbers, acryl-based rubbers, silicone-based rubbers, MBS, core-shell type polymers or the like. As the inorganic reinforcing agents, there are exemplified glass fibers other than the long fibers, carbon fibers, aramid fibers, mica, talc, wollastonite, potassium titanate, calcium carbonate, silica or the like.

As a method for producing the long fiber reinforced thermoplastic resin (A) which is the molding material of molding body according to the present invention, a drawing method is preferred. The drawing method comprises essentially immersing the resin into a continuous fiber bundle while drawing the continuous fiber bundle. As the drawing method, there are known a method comprising passing a fiber into an immersing bath filled with a resin emulsion, resin suspension or resin solution, a method comprising attaching a resin powder to a fiber by blowing the resin powder to the fiber or passing the fiber into a bath filled with the resin powder and thereafter melting the resin powder to immerse the resin into the fiber, and a method comprising feeding a melting resin to a crosshead from an extruder during passing a fiber into the crosshead to immerse the resin into the fiber, and any of method can be used. An especially preferred long fiber reinforced thermoplastic resin (A) as the molding material is one produced by feeding a melting resin to a crosshead from an extruder during passing a fiber into the crosshead, immersing the resin into the fiber, cooling it and cutting it into a pellet-shape having a length of 3.0 to 50 mm, preferably 4.0 to 30 mm. In thus produced pellet, since the fiber for reinforcing is oriented in parallel to the pellet, the length of fiber for reinforcing is almost equal to the length of pellet. When the length of pellet is less than 3.0 mm, the length of fiber for reinforcing is also short and the reinforcing effect thereby is insufficient. When the length of pellet is more than 50 mm, by increasing the bulk density thereof, there is a possibility that a bridging trouble in a hopper arises at the molding or stable molding cannot be conducted by insufficient biting the pellet in a screw.

In case where a mixture prepared from blending a recycled resin (B) into the long fiber reinforced thermoplastic resin (A) is used as the molding material of molding body according to the present invention, it is preferred that the blending ratio thereof based on the weight of mixture satisfies such ranges that the weight of resin (A) is 30 to 100% by weight and the weight of resin (B) is 0 to 70% by weight. When the amount of long fiber reinforced thermoplastic resin (A) is less than 30% by weight, the mechanical strength, dimension stability and appearance are deteriorated, therefore it is not preferred. Further, it is preferred that the shape and size of the long fiber reinforced thermoplastic resin (A) approximates to those of the recycled resin (B) as possible so as to prevent from classifying thereof in the molding step.

The recycled resin (B) blended into the long fiber reinforced thermoplastic resin (A) as the molding material of molding body according to the present invention is not specifically limited and a recycled product of thermoplastic resin (A) may be used in view of compatibility. However, the following resin combination is more preferred.

(1) In case where the long fiber reinforced thermoplastic resin (A) is selected from polyester resins, aromatic polycarbonate resins or alloys thereof, the recycled resin (B) is a recycled product of aromatic polycarbonate resin having a viscosity average molecular weight of 10000 to 17000. In this combination, the fluidity is excellent, the breakage of reinforced fiber in the molding step is few, as well as molding shrinkage rate and linear expansion coefficient are effectively reduced by formation of alloy to the crystalline resin so that it can be used for the molding material of large size molding body. In this case, a compatible improver may be blended, if required.

(2) In case where the long fiber reinforced thermoplastic resin (A) is a polyamide resin, the recycled resin (B) is at least one selected from the group consisting of polypropylene, polyethylene, polystyrene and acrylonitrile-styrene-butadiene copolymer. In this combination, the fluidity is excellent so that it can be used for the molding material of large size molding body. In this case, a compatible improver may be blended, if required.

As the recycled resin (B), there are exemplified purged resins at the molding, sprue, runners, not good products generated in steps such as molding step, secondary processing step and assembling step, recycled molding products after using in the objective use and recycled product from various stages. Of course, the shape of molding product is not limited. Concretely, there can be used recycled products obtained from crushed exterior plates, structure parts or other molding products of automobile, electric•electronic•OA equipments or the like. However, it is not preferable to use molding products attaching much solvent, oil and fat or the like because of deterioration of mechanical strength, heat stability and appearance.

The blending method of the recycled resin (B) with the long fiber reinforced thermoplastic resin (A) is not limited and there can be used, for example, various mixing equipment such as Hensel mixer, ribbon blender, V-type blender, extruders, Bunbary mixer, laboplasto mil (blabender) and kneeder.

When using the molding body according to the present invention as exterior molding bodies for automobiles, it is preferred to use for exterior molding bodies for automobiles or structure thereof which requires dimension accuracy, such as bonnet, roof, hood, front panel, canopy, trunk lid, door panel, pillar, and exterior panel or structured body for automobiles resemble to the above mentioned products.

The exterior molding body comprising a long fiber reinforced thermoplastic resin according to the present invention preferably has at least one non-reinforced resin layer laminated on the outside surface of the exterior molding body, and the layer thickness ratio of long fiber reinforced layer and non-reinforced resin layer in a section vertical to the laminate face is preferably not less than 1.0, more preferably not less than 1.2. When the layer thickness ratio of long fiber reinforced layer and non-reinforced resin layer is less than 1.0, there is a possibility of warpage of molding body caused by a difference of linear extensions of the long fiber reinforced layer and non-reinforced resin layer during molding the long fiber reinforced molding body or by change of temperature circumstance, therefore it is not preferred. Further, the non-reinforced resin used in the above lamination is not specifically limited but as the resin, it is preferred to use a same kind resin to the resin constituting the long fiber reinforced thermoplastic resin or an alloy thereof as a main component in view of adhesion between the layers. Also, when laminating, a decoration part comprising characters, emblems and/or marks may be enclosed between the long fiber reinforced layer and the non-reinforced resin layer. Thus obtained molding body is effectively suitable as an exterior molding body for automobile excellent in appearance property, designability and durability of design.

In the present invention, as a method for forming at least one non-reinforced resin layer laminated on the outer surface of exterior molding body comprising a long fiber reinforced thermoplastic resin, there may be mentioned generally used processing methods for thermoplastic resins such as a lamination method of at least one non-reinforced resin layer(s), for example non-reinforced resin film(s) or sheet(s) at the same time of injection molding; transfer molding method; coinjection molding method; double molding method; and weld molding methods, for example, hot plate welding, vibration welding and laser welding. Of these, the lamination method of the non-reinforced resin film(s) or sheet(s) at the same time of injection molding is especially preferred in view of appearance molding of product, designability and reduction of production steps.

In the present invention, in case where the lamination method of the non-reinforced resin film(s) or sheet(s) at the same time of injection molding is used, in order to promote the heat welding to the resin composition at the melt injection filling stage and more ensure the lamination integration therebetween, a primer coat may be provided on the film or sheet. As resins used for the primer coating, there are selected resins having higher melt viscosity than the thermoplastic resin constituting the molding body and good adhesiveness to the film or sheet. As the resin, there are exemplified a resin which is the same kind resin of the thermoplastic resin and has the higher molecular weight, or a resin composition mainly comprising it; or curable resins by heat or ultraviolet radiation.

The molding body according to the present invention may has a functional layer having at least one function(s) selected from hard coat, antifog, antistatic, antireflection and heat interruption, or may be surface-decorated by painting or transferring, on one surface, if required. In order to form the functional layer, various known methods may be used. As a method for forming the hard coat layer, there is used a method comprising forming a primer layer, if desired, coating a hard coat agent such as epoxy-based, acrylic-based, amino resin-based, polysiloxane-based and colloidal silica-based agents, and curing by heat, ultraviolet radiation, or the like. As a method for forming the antifog layer, there is used a method comprising coating an antifog paint essentially containing a water-soluble or hydrophilic resin and a surfactant, and curing thereof. Further, as methods for forming the antistatic layer, the antireflection layer and the heat interruption layer, there are used a method comprising coating a paint which is capable of imparting the above at least one function(s) and curing thereof, or a vacuum deposition method to form a thin film having the above at least one function(s). Further, as the functional layer, a composite layer having two or more functions at the same time may be also used. Further, a design imparting layer may be also formed by prior conducting a paint treatment for decoration to impart designability in addition to or on these functional layers.

EXAMPLES

The present invention will be explained in further detail with reference to figures and preferred examples thereof, but it should be understood that the present invention is not limited to these examples. In the following descriptions of the Examples and the Comparative Examples, all "%" are by weight unless otherwise noted.

<Evaluation>

Evaluation 1. Fiber Content and Weight Average Fiber Length:

The optional portions of the exterior molding body comprising the long fiber reinforced thermoplastic resin was randomly cut to use specimens. After only the thermoplastic resin components in the specimens were combusted in an electric furnace, the weight and length of remaining fiber were measured. The ratio of remaining fiber weight to the specimen weight before combustion was defined as the fiber content and the weight average value of fiber length was defined as the weight average fiber length.

Evaluation 2. Intrinsic Viscosity and Viscosity Average Molecular Weight:

The optional portions of the exterior molding body comprising the long fiber reinforced thermoplastic resin was randomly cut to use specimens. In case of using polybutylene terephthalate resin as the thermoplastic resin, intrinsic viscosity was measured in a mixed solvent of phenol and tetrachloroethane (1:1 by weight) at 30° C. and was shown as the intrinsic viscosity. In case of using polycarbonate resin as the thermoplastic resin, the viscosity average molecular weight was calculated based on the value of intrinsic viscosity ([η]) (unit: dl/g) measured in dichloromethane at 25° C.

Evaluation 3. Mechanical Properties:

The optional portions having a thickness of 2 mm or more in the exterior molding body comprising the long fiber reinforced thermoplastic resin was randomly cut to prepare strip specimens having a size of 80 mm×10 mm. To the specimens, the bending elastic modulus and bending strength were measured according to ISO 178 and the notched Charpy impact resistance was measured according to ISO 179. The measurements were conducted in the specimen number of n=10.

Evaluation 4. Linear Expansion Coefficient:

The optional portions having a thickness of 2 mm or more in the exterior molding body comprising the long fiber reinforced thermoplastic resin was randomly cut to prepare strip specimens having a size of 30 mm×10 mm. To the specimens, the linear expansion coefficient was measured at the temperature range of 23 to 80° C. The measurements were conducted in the specimen number of n=10 and in two directions bisecting at right angles in each specimen. To the obtained values, the maximum linear expansion coefficient was divided by the minimum linear expansion coefficient to calculate a ratio thereof. It is evaluated that the more the ratio is small, the more the anisotropy is reduced.

Evaluation 5. Maximum Dimension Change Rate Under Condition of Moisture Absorption:

The exterior molding body comprising the long fiber reinforced polyamide resin was subjected to the water absorption treatment until it became a saturate absorption condition under 23° C. and 50% of relative humidity. Before and after water absorption treatment, width and breadth sizes thereof were measured by use of markings showing four corners of at least five square marks (about 25 to 50 mm on a side) which were drawn at the optional portions on the surface of molding body having a thickness of not less than 2 mm as shown in FIG. 5 to FIG. 8. The dimension change rate under condition of moisture absorption was calculated by the following formula using the measured values and was expressed as the maximum value in the calculated values.

maximum dimension change rate under condition of moisture absorption=[(dimension after water absorption−dimension before water absorption)/ dimension before water absorption]×100

Figure 5:
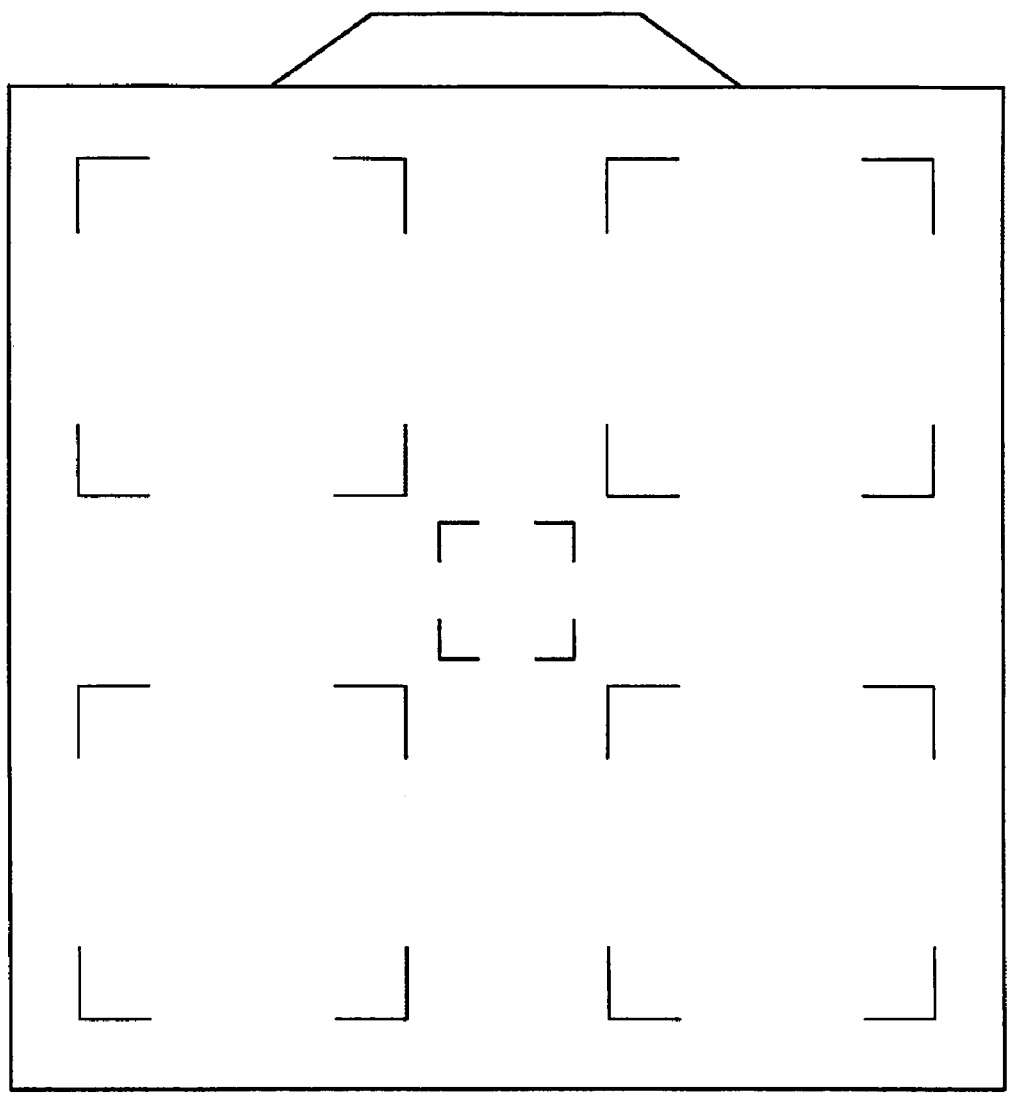
FIG. 5 is planer views and side views of exterior molding bodies obtained in Examples 6 to 8 and Comparative Examples 7, 8 11 and 13.
Figure 5:
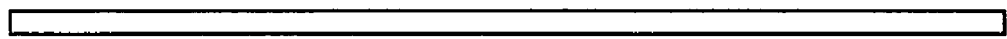

In Example 10 and Comparative Example 12, the surfaces of obtained molding bodies were marked as shown in FIG. 5 to use for calculation of maximum dimension change rate under condition of moisture absorption.

Example 1

Preparation of Long Glass Fiber Reinforced Polyester Resin Pellet

A long glass fiber reinforced polyester resin pellet whose fiber content was 30% and fiber length was 10 mm was produced by the withdrawing molding method in which during opening s continuous glass fiber bundle (roving) and taking off thereof, it was passed into an immersing die to immerse a melting resin fed thereinto to the glass fiber, and thereafter, diluted, cooled and cut to produce it. As the resin, polybutylene terephthlate resin (manufactured by Mitsubishi Engineering-Plastics Corporation, commercial name: Novaduran 5008, intrinsic viscosity: 0.85 dl/g, titanium atom content: 30 ppm) was melted and used. The glass fiber in the obtained pellet had a diameter of 16 μm and a length equal to the length of pellet and was oriented in substantially parallel to the length direction of pellet.

<Injection Molding of Exterior Molding Body>

A tabular exterior molding body having thickness of 3 mm, size of 150 mm×150 mm and maximum project area of 22500 mm² shown in FIG. 1 was molded by use of an injection molding machine IS-150 manufactured by Toshiba Machine Co., Ltd. Namely, the above prepared long glass fiber reinforced polyester resin pellet was fed into a heated cylinder of injection molding machine at 270° C., plasticized, melted and weighed. The plasticizing and weighing were conducted while loading a back-pressure of 5 MPa as the gauge pressure of injection molding machine. After weighing, the melted resin composition was fed into a mold cavity through a resin gate shown in Figure. Molding thereof was conducted such a manner that the injection time was 2 sec, the pressure keeping was 100 MPa as the gauge pressure of injection molding machine for 20 sec, the mold was opened after 25 sec quenching and an exterior molding body comprising a long fiber reinforced thermoplastic resin was taken off to complete the molding. The temperature of mold when taking off it was 70° C.

Thus obtained long fiber reinforced exterior molding body was a high-stiffness structure. Further, the evaluation results of the fiber content, weight average fiber length, mechanical properties, linear expansion coefficient and intrinsic viscosity for the specimen pieces cut from the molding body were shown in the following Table 1. As seen from the results, the obtained long fiber reinforced exterior molding body is very excellent in all mechanical properties, and small in all anisotropy of linear expansion coefficient and linear expansion coefficients. Therefore, the obtained long fiber reinforced exterior molding body satisfies functions required in the exterior molding body for automobiles.

Example 2

The same procedures as defined in Example 1 was conducted except that the fiber content was changed from 30% to 50% at the preparation of long glass fiber reinforced polyester resin pellet to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient and intrinsic viscosity for the specimen pieces cut from the molding body were shown in the following Table 1. As seen from the results, the obtained long fiber reinforced exterior molding body is very excellent in all mechanical properties, and small in all anisotropy of linear expansion coefficient and linear expansion coefficients. Therefore, the obtained long fiber reinforced exterior molding body satisfies functions required in the exterior molding body for automobiles.

Example 3

Figure 2:
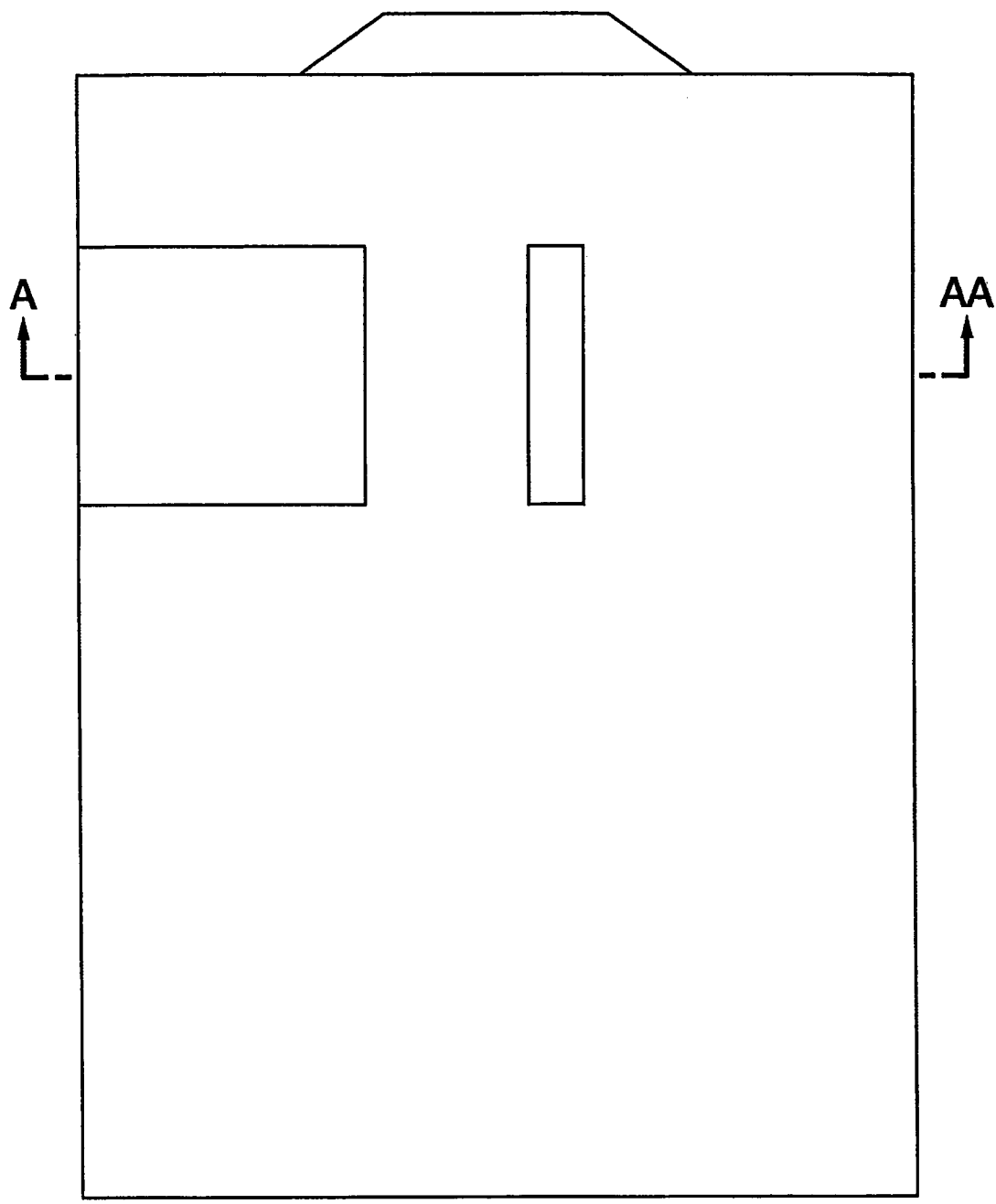
FIG. 2 is a planer view and a side view of exterior molding body obtained in Example 3.
Figure 2:

The same procedures as defined in Example 2 was conducted except that at the injection molding of exterior molding body, instead of the tabular exterior molding body shown in FIG. 1, an exterior molding body which has a thickness of 3 mm, a size of 150 mm×200 mm, a notched portion, a maximum project area of 27300 mm$^2$, and a narrow flow path having a cross sectional area of 90 mm$^2$ and flow path length of 45 mm, shown in FIG. 2 was used to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient and intrinsic viscosity for the specimen pieces cut from the molding body were shown in the following Table 1. As seen from the results, the obtained long fiber reinforced exterior molding body is very excellent in all mechanical properties, and small in all anisotropy of linear expansion coefficient and linear expansion coefficients. Therefore, the obtained long fiber reinforced exterior molding body satisfies functions required in the exterior molding body for automobiles.

Example 4

The same procedures as defined in Example 2 was conducted except that at the injection molding of exterior molding body, instead of the long glass fiber reinforced polyester resin pellet, a mixture (fiber content: 40%) comprising 80% by weight of the above long glass fiber reinforced polyester resin (A) pellet and 20% by weight of aromatic polycarbonate (B) having a viscosity average molecular weight of 14000 was used to obtain a long fiber reinforced exterior molding body. The aromatic polycarbonate (B) was a recycled product obtained by a method comprising releasing a design film and function film from a media for recording (CD) in a heated water bath containing a chemical treatment agent and crashing thereof.

Thus obtained long fiber reinforced exterior molding body was a high-stiffness structure. Further, the evaluation results of the fiber content, weight average fiber length, mechanical properties, linear expansion coefficient and intrinsic viscosity for the specimen pieces cut from the molding body were shown in the following Table 1. As seen from the results, the obtained long fiber reinforced exterior molding body is very excellent in all mechanical properties, and small in all anisotropy of linear expansion coefficient and linear expansion coefficients. Therefore, the obtained long fiber reinforced exterior molding body satisfies functions required in the exterior molding body for automobiles.

Example 5

The same procedures as defined in Example 2 was conducted except that at the injection molding of exterior molding body, a mold cavity having a thickness of 4 mm, a size of 150 mm×150 mm was used as the mold cavity, and pre-molded 0.5 mm thickness sheets made of polycarbonate and having a hard coat functional layer (manufactured by Mitsubishi Engineering-Plastics Corporation, commercial name: Iupilon Sheet CFI-5) were placed on the both surfaces of mold cavity, to obtain an exterior molding body comprising the long fiber reinforced resin layer and non-reinforced resin layers laminated on the both surfaces thereof (maximum project area of 22500 mm$^2$). In thus laminated tabular exterior molding body, the thickness ratio of long fiber reinforced resin layer/non-reinforced resin layers was 3. The sheet made of polycarbonate had a hard coat layer on one surface thereof and had a cross shape print on the other surface thereof. The molding was conducted by such a manner that the hard coat layer thereof contacted with the mold surface (the cross shape mark was included).

Thus obtained long fiber reinforced exterior molding body was excellent in flatness and was a high-stiffness structure. Further, the evaluation results of the fiber content, weight average fiber length, mechanical properties, linear expansion coefficient and intrinsic viscosity for the specimen pieces cut from the molding body were shown in the following Table 1. As seen from the results, the obtained long fiber reinforced exterior molding body is very excellent in all mechanical properties, and small in all anisotropy of linear expansion coefficient and linear expansion coefficients. Therefore, the obtained long fiber reinforced exterior molding body satisfies functions required in the exterior molding body for automobiles.

TABLE 1

| | Example | | |
|---|---|---|---|
| | 1 | 2 | 3 |
| Materials | | | |
| Resin kind | PBT | PBT | PBT |
| Intrinsic viscosity [dl/g] | 0.85 | 0.85 | 0.85 |
| Viscosity average molecular weight | — | — | — |
| Glass fiber | | | |
| Content [% by weight] | 30.5 | 49.6 | 50.4 |
| Weight average fiber length [mm] | 2.97 | 2.65 | 3 |
| Diameter [μm] | 16 | 16 | 16 |
| Molding body | | | |
| Maximum projection area [mm$^2$] | 22500 | 22500 | 27300 |
| Intrinsic viscosity [dl/g] | 1.10 | 1.15 | 1.12 |
| Viscosity average molecular weight | — | — | — |
| Narrow flow path | | | |
| Cross sectional area [mm$^2$] | — | — | 90 |
| Path length [mm] | — | — | 45 |

TABLE 1-continued

Lamination

| | | | |
|---|---|---|---|
| Reinforced layer/non-reinforced layer | — | — | — |

Bending properties

| | | | |
|---|---|---|---|
| Bending elastic modulus [GPa] | 10.2 | 12.3 | 12.5 |
| Bending strength [MPa] | 230 | 250 | 242 |
| Charpy impact resistance [kJ/mm$^2$] | 28 | 42 | 39 |

Linear expansion coefficient

| | | | |
|---|---|---|---|
| Maximum value [×10$^{-5}$K$^{-1}$] | 4.8 | 4.6 | 4.2 |
| Minimum value [×10$^{-5}$K$^{-1}$] | 4.1 | 3.4 | 3.5 |
| Maximum value/Minimum Value (anisotropy) | 1.2 | 1.4 | 1.2 |

| | Example | |
|---|---|---|
| | 4 | 5 |

Materials

| | | |
|---|---|---|
| Resin kind | PBT/Recycled PC | PBT |
| Intrinsic viscosity [dl/g] | 0.85 | 0.85 |
| Viscosity average molecular weight | 14000 | — |

Glass fiber

| | | |
|---|---|---|
| Content [% by weight] | 40.5 | 37.9 |
| Weight average fiber length [mm] | 1.96 | 2.88 |
| Diameter [μm] | 16 | 16 |

Molding body

| | | |
|---|---|---|
| Maximum projection area [mm$^2$] | 22500 | 22500 |
| Intrinsic viscosity [sl/g] | 1.16 | 1.10 |
| Viscosity average molecular weight | 13500 | — |

Narrow flow path

| | | |
|---|---|---|
| Cross sectional area [mm$^2$] | — | — |
| Path length [mm] | — | — |

Lamination

| | | |
|---|---|---|
| Thickness ratio of reinforced layer/non-reinforced layer | — | 3 |

Bending properties

| | | |
|---|---|---|
| Bending elastic modulus [GPa] | 10.6 | 8.9 |
| Bending strength [MPa] | 200 | 196 |
| Charpy impact resistance [kJ/mm$^2$] | 35 | 48 |

Linear expansion coefficient

| | | |
|---|---|---|
| Maximum value [×10$^{-5}$K$^{-1}$] | 4.4 | 4.7 |
| Minimum value [×10$^{-5}$K$^{-1}$] | 3.2 | 3.6 |
| Maximum value/Minimum Value (anisotropy) | 1.4 | 1.3 |

Comparative Example 1

The same procedures as defined in Example 1 was conducted except that the fiber content was changed from 30% to 15% at the preparation of long glass fiber reinforced polyester resin pellet to obtain a long fiber reinforced exterior molding body.

Thus obtained long fiber reinforced exterior molding body was a low-stiffness structure. Further, the evaluation results of the fiber content, weight average fiber length, mechanical properties, linear expansion coefficient and intrinsic viscosity for the specimen pieces cut from the molding body were shown in the following Table 2. As seen from the results, although the weight average fiber length of molding body was relatively long as 2.6 mm, the mechanical properties thereof were poor. Further, although the anisotropy of linear expansion coefficient (maximum linear expansion coefficient/minimum linear expansion coefficient ratio) was 1.5, the maximum linear expansion coefficient was large as $7.1 \times 10^{-5} K^{-1}$. Therefore, the obtained long fiber reinforced exterior molding body did not satisfy functions required in the exterior molding body for automobiles.

Comparative Example 2

The same procedures as defined in Example 1 was conducted except that polybutylene terephthalate whose fiber content of 30% by weight (manufactured by Mitsubishi Engineering-Plastics Corporation, commercial name: Novaduran 5010G45, intrinsic viscosity: 0.10 dl/g) was used instead of the prepared long glass fiber reinforced polyester resin pellet to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient and intrinsic viscosity for the specimen pieces cut from the molding body were shown in the following Table 2. As seen from the results, since the weight average fiber length of molding body was short as 0.35 mm, the impact resistance thereof was poor. Also, the maximum linear expansion coefficient was large as $6.2 \times 10^{-5} K^{-1}$ and the anisotropy of linear expansion coefficient was large as 1.9. Therefore, the obtained long fiber reinforced exterior molding body did not satisfy functions required in the exterior molding body for automobiles.

Comparative Example 3

Figure 3:
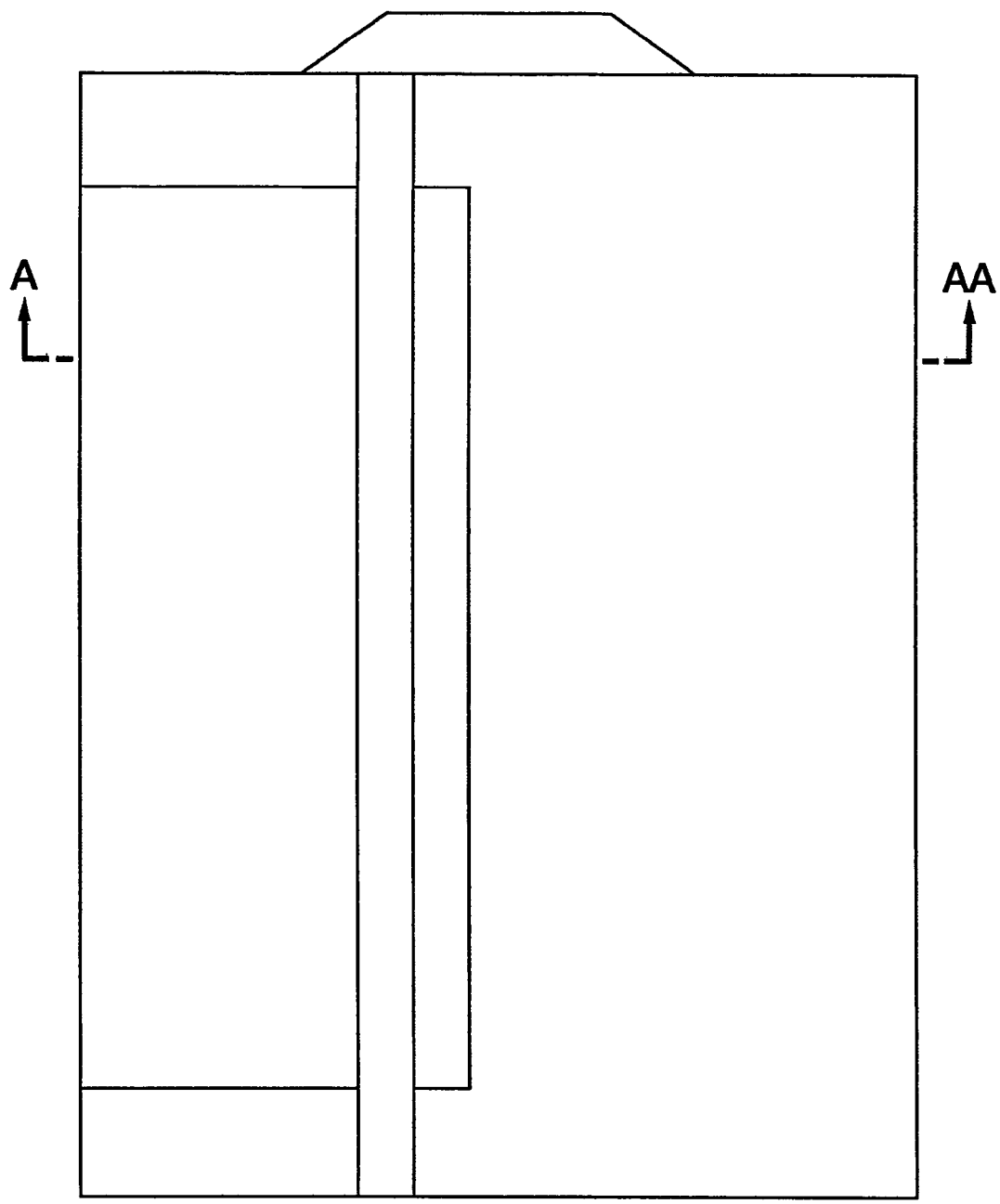
FIG. 3 is a planer view and a side view of exterior molding body obtained in Comparative Example 3.
Figure 3:

The same procedures as defined in Example 2 was conducted except that at the injection molding of exterior molding body, instead of the tabular exterior molding body shown in FIG. 1, an exterior molding body which has a thickness of 3 mm (4 mm in some parts), a size of 150 mm×200 mm, a notched portion, a maximum project area of 20400 mm$^2$, and a narrow flow path having a cross sectional area of 40 mm$^2$ and flow path length of 160 mm, shown in FIG. 3 was used to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient and intrinsic viscosity for the specimen pieces cut from the molding body were shown in the following Table 2. As seen from the results, the maximum linear expansion coefficient was large as $5.6 \times 10^{-5} K^{-1}$ and the anisotropy of linear expansion coefficient was large as 2.7. Therefore, the obtained long fiber reinforced exterior molding body did not satisfy functions required in the exterior molding body for automobiles.

Comparative Example 4

Figure 4:
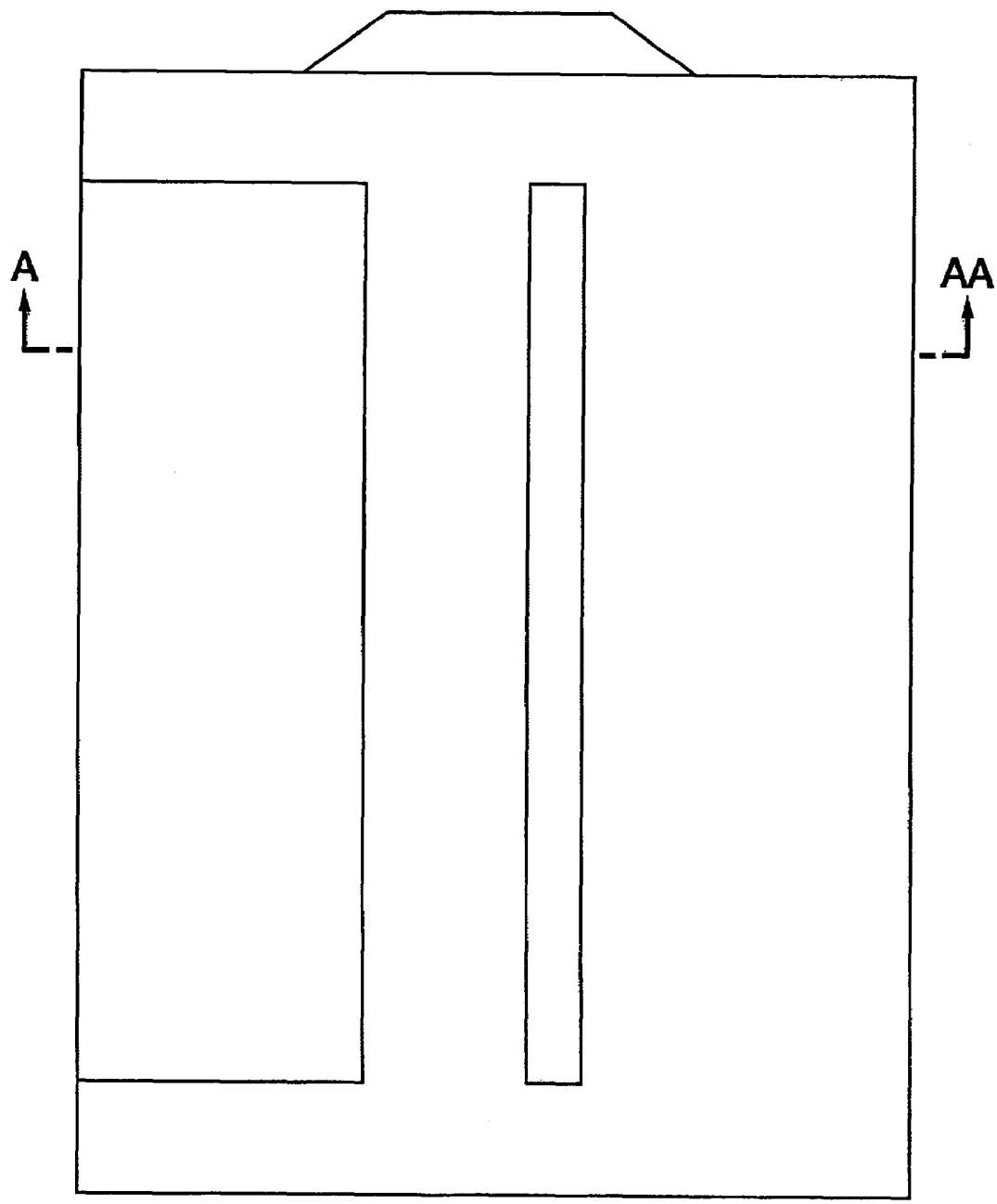
FIG. 4 is a planer view and a side view of exterior molding body obtained in Comparative Example 4.
Figure 4:

The same procedures as defined in Example 2 was conducted except that at the injection molding of exterior molding body, instead of the tabular exterior molding body shown in FIG. 1, an exterior molding body which has a thickness of 3 mm, a size of 150 mm×200 mm, a notched portion, a maximum project area of 20400 mm$^2$, and a narrow flow path having a cross sectional area of 90 mm$^2$ and flow path length of 160 mm, shown in FIG. 4 was used to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient and intrinsic viscosity for the specimen pieces cut from the molding body were shown in the following Table 2. As seen from the results, the maximum linear expansion coefficient was large as 6.4×10⁻⁵K⁻¹ and the anisotropy of linear expansion coefficient was large as 3.4. Therefore, the obtained long fiber reinforced exterior molding body did not satisfy functions required in the exterior molding body for automobiles.

Comparative Example 5

The same procedures as defined in Example 2 was conducted except that polybutylene terephthalate (manufactured by Mitsubishi Engineering-Plastics Corporation, commercial name: Novaduran 5020, intrinsic viscosity: 1.20 dl/g) was used instead of polybutylene terephthalate (manufactured by Mitsubishi Engineering-Plastics Corporation, commercial name: Novaduran 5008, intrinsic viscosity: 0.85 dl/g, titanium atom content: 30 ppm) at the preparation of long glass fiber reinforced polyester resin pellet to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient and intrinsic viscosity for the specimen pieces cut from the molding body were shown in the following Table 2. As seen from the results, since the weight average fiber length of molding body was short as 0.94 mm, the impact resistance thereof was poor. Also, the maximum linear expansion coefficient was large as 5.2×10⁻⁵K⁻¹. Therefore, the obtained long fiber reinforced exterior molding body did not satisfy functions required in the exterior molding body for automobiles.

Comparative Example 6

The same procedures as defined in Example 5 was conducted except that at the injection molding of exterior molding body, 1.1 mm thickness polycarbonate sheets having a hard coat functional layer were placed on the both surfaces of mold cavity instead of the pre-molded 0.5 mm thickness sheets made of polycarbonate and having a hard coat functional layer (manufactured by Mitsubishi Engineering-Plastics Corporation, commercial name: Iupilon Sheet CFI-5), to obtain an exterior molding body comprising the long fiber reinforced resin layer and non-reinforced resin layers laminated on the both surfaces thereof. In thus laminated tabular exterior molding body, the thickness ratio of long fiber reinforced resin layer/non-reinforced resin layers was 0.82.

Thus obtained long fiber reinforced exterior molding body was excellent in flatness. Further, the evaluation results of the fiber content, weight average fiber length, mechanical properties, linear expansion coefficient and intrinsic viscosity for the specimen pieces cut from the molding body were shown in the following Table 2. As seen from the results, although the impact resistance was good, the mechanical properties such as rigidity and mechanical strength thereof were poor. Also, both maximum linear expansion coefficient and minimum linear expansion coefficient were not less than as 5×10⁻⁵K⁻¹. Therefore, the obtained long fiber reinforced exterior molding body did not satisfy functions required in the exterior molding body for automobiles.

TABLE 2

| | Comparative Example | | |
|---|---|---|---|
| | 1 | 2 | 3 |
| Materials | | | |
| Resin kind | PBT | PBT | PBT |
| Intrinsic viscosity [dl/g] | 0.85 | 0.85 | 0.85 |
| Glass fiber | | | |
| Content [% by weight] | 15.4 | 45.6 | 50.3 |
| Weight average fiber length [mm] | 2.64 | 0.35 | 2.65 |
| Diameter [μm] | 16 | 16 | 16 |
| Molding body | | | |
| Maximum projection area [mm²] | 22500 | 22500 | 20400 |
| Intrinsic viscosity [dl/g] | 1.10 | 0.85 | 1.13 |
| Narrow flow path | | | |
| Cross sectional area [mm²] | — | — | 40 |
| Path length [mm] | — | — | 160 |
| Lamination | | | |
| Reinforced layer/non-reinforced layer | — | — | — |
| Bending properties | | | |
| Bending elastic modulus [GPa] | 5.7 | 12.9 | 12.4 |
| Bending strength [MPa] | 143 | 238 | 246 |
| Charpy impact resistance [kJ/mm²] | 13 | 10 | 40 |
| Linear expansion coefficient | | | |
| Maximum value [×10⁻⁵K⁻¹] | 7.1 | 6.2 | 5.6 |
| Minimum value [×10⁻⁵K⁻¹] | 4.9 | 3.3 | 2.1 |
| Maximum value/Minimum Value (anisotropy) | 1.5 | 1.9 | 2.7 |

| | Comparative Example | | |
|---|---|---|---|
| | 4 | 5 | 6 |
| Materials | | | |
| Resin kind | PBT | PBT | PBT |
| Intrinsic viscosity [dl/g] | 0.85 | 1.20 | 0.85 |
| Glass fiber | | | |
| Content [% by weight] | 50.2 | 49.4 | 24.7 |
| Weight average fiber length [mm] | 2.39 | 0.94 | 2.44 |
| Diameter [μm] | 16 | 16 | 16 |
| Molding body | | | |
| Maximum projection area [mm²] | 20400 | 22500 | 22500 |
| Intrinsic viscosity [sl/g] | 1.08 | 1.56 | 1.09 |
| Narrow flow path | | | |
| Cross sectional area [mm²] | 90 | — | — |
| Path length [mm] | 160 | — | — |
| Lamination | | | |
| Reinforced layer/non-reinforced layer | — | — | 0.82 |
| Bending properties | | | |
| Bending elastic modulus [GPa] | 12.4 | 12.6 | 5.2 |
| Bending strength [MPa] | 251 | 245 | 196 |
| Charpy impact resistance [kJ/mm²] | 42 | 12 | 60 |
| Linear expansion coefficient | | | |
| Maximum value [×10⁻⁵K⁻¹] | 6.4 | 5.2 | 6 |
| Minimum value [×10⁻⁵K⁻¹] | 1.9 | 2.9 | 5.2 |
| Maximum value/Minimum Value (anisotropy) | 3.4 | 1.8 | 1.2 |

Example 6

Preparation of Long Glass Fiber Reinforced Polyester Resin Pellet

A long glass fiber reinforced polyester resin pellet whose fiber content was 30% and fiber length was 10 mm was produced by the withdrawing molding method in which during opening s continuous glass fiber bundle (roving) and taking off thereof, it was passed into an immersing die to immerse a melting resin fed thereinto to the glass fiber, and thereafter, diluted, cooled and cut to produce it. As the resin, polyamide 6 (manufactured by Mitsubishi Engineering-Plastics Corporation, commercial name: Novamid 1007J, relative viscosity: 2.2) was melted and used. The glass fiber in the obtained pellet had a diameter of 16 μm and a length equal to the length of pellet and was oriented in substantially parallel to the length direction of pellet.

<Injection Molding of Exterior Molding Body>

A tabular exterior molding body having thickness of 3 mm, size of 150 mm×150 mm and maximum project area of 22500 mm$^2$ shown in FIG. 1 was molded by use of an injection molding machine IS-150 manufactured by Toshiba Machine Co., Ltd. Namely, the above prepared long glass fiber reinforced polyamide resin pellet was fed into a heated cylinder of injection molding machine at 270° C., plasticized, melted and weighed. The plasticizing and weighing were conducted while loading a back-pressure of 5 MPa as the gauge pressure of injection molding machine. After weighing, the melted resin composition was fed into a mold cavity through a resin gate shown in Figure. Molding thereof was conducted such a manner that the injection time was 2 sec, the pressure keeping was 100 MPa as the gauge pressure of injection molding machine for 20 sec, the mold was opened after 25 sec quenching and an exterior molding body comprising a long fiber reinforced polyamide resin was taken off to complete the molding. The temperature of mold when taking off it was 70° C.

Thus obtained long fiber reinforced exterior molding body was a high-stiffness structure. Further, the evaluation results of the fiber content, weight average fiber length, mechanical properties, linear expansion coefficient, maximum dimension change rate under condition of moisture absorption and relative viscosity for the specimen pieces cut from the molding body were shown in the following Table 3. As seen from the results, the obtained long fiber reinforced exterior molding body is very excellent in all mechanical properties, and small in all anisotropy of linear expansion coefficient, linear expansion coefficients and maximum dimension change rate under condition of moisture absorption. Therefore, the obtained long fiber reinforced exterior molding body satisfies functions required in the exterior molding body for automobiles.

Example 7

The same procedures as defined in Example 6 was conducted except that the fiber content was changed from 30% to 50% at the preparation of long glass fiber reinforced polyamide resin pellet to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient, maximum dimension change rate under condition of moisture absorption and relative viscosity for the specimen pieces cut from the molding body were shown in the following Table 3. As seen from the results, the obtained long fiber reinforced exterior molding body is very excellent in all mechanical properties, and small in all anisotropy of linear expansion coefficient, linear expansion coefficients and maximum dimension change rate under condition of moisture absorption. Therefore, the obtained long fiber reinforced exterior molding body satisfies functions required in the exterior molding body for automobiles.

Example 8

The same procedures as defined in Example 7 was conducted except that an aromatic polyamide (manufactured by Mitsubishi Engineering-Plastics Corporation, commercial name: Reny 6002, relative viscosity: 2.1, abbreviated as MXD6-PA) was used at the preparation of long glass fiber reinforced polyamide resin pellet instead of polyamide 6 and the heating cylinder temperature and mold temperature of injection molding machine at the injection molding were changed from 270° C. to 280° C. and from 70° C. to 135° C., respectively, to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient and maximum dimension change rate under condition of moisture absorption and relative viscosity for the specimen pieces cut from the molding body were shown in the following Table 3. As seen from the results, the obtained long fiber reinforced exterior molding body is very excellent in all mechanical properties, and small in all anisotropy of linear expansion coefficient, linear expansion coefficients and maximum dimension change rate under condition of moisture absorption. Therefore, the obtained long fiber reinforced exterior molding body satisfies functions required in the exterior molding body for automobiles.

Example 9

Figure 6:
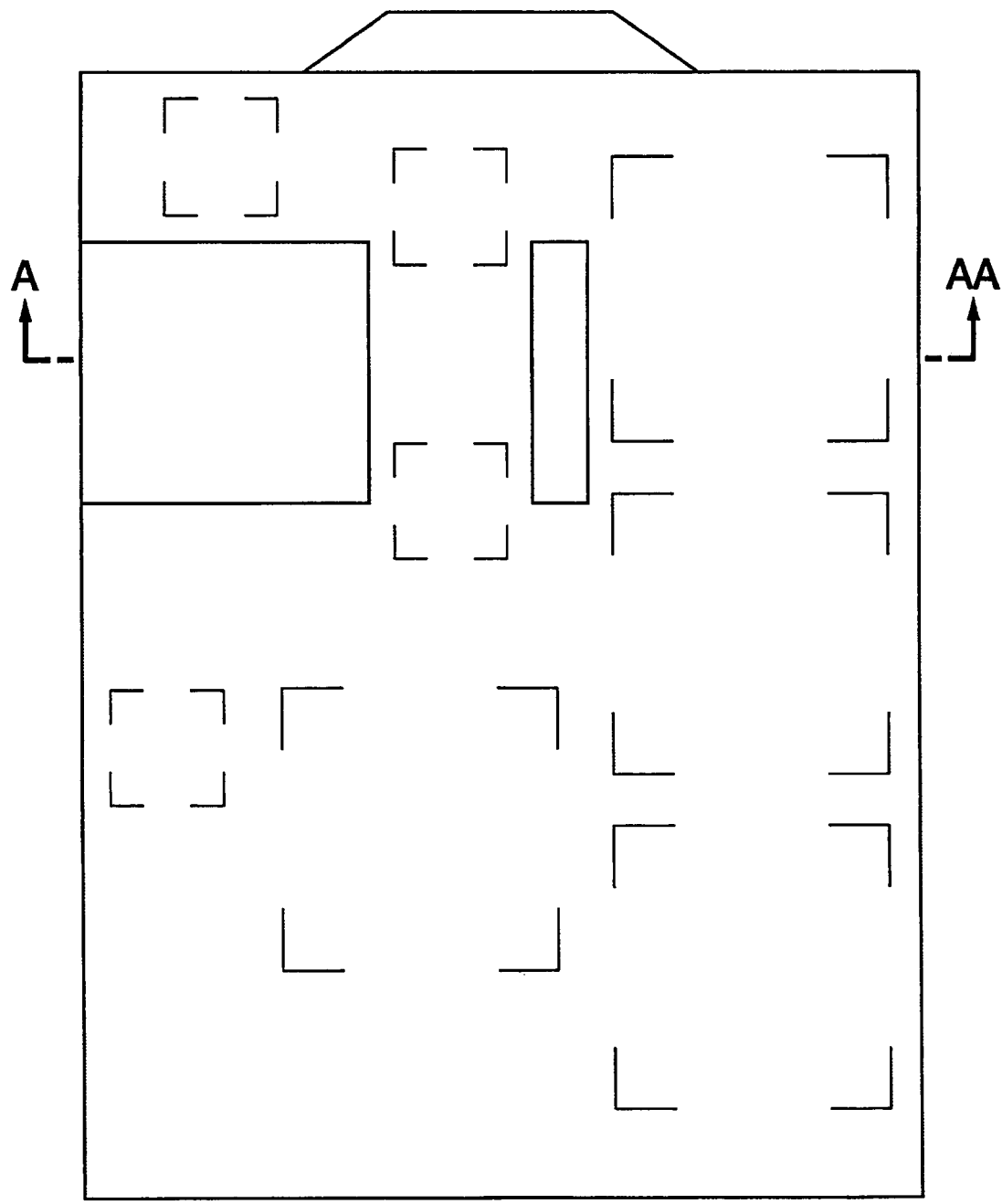
FIG. 6 is a planer view and side view of exterior molding body obtained in Example 9.
Figure 6:

The same procedures as defined in Example 7 was conducted except that at the injection molding of exterior molding body, instead of the tabular exterior molding body shown in FIG. 5, an exterior molding body which has a thickness of 3 mm, a size of 150 mm×200 mm, a notched portion, a maximum project area of 27300 mm$^2$, and a narrow flow path having a cross sectional area of 90 mm$^2$ and flow path length of 45 mm, shown in FIG. 6 was used to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient, maximum dimension change rate under condition of moisture absorption and relative viscosity for the specimen pieces cut from the molding body were shown in the following Table 3. As seen from the results, the obtained long fiber reinforced exterior molding body is very excellent in all mechanical properties, and small in all anisotropy of linear expansion coefficient, linear expansion coefficients and maximum dimension change rate under condition of moisture absorption. Therefore, the obtained long fiber reinforced exterior molding body satisfies functions required in the exterior molding body for automobiles.

Example 10

The same procedures as defined in Example 7 was conducted except that at the injection molding of exterior molding body, a mold cavity having a thickness of 4 mm, a size of 150 mm×150 mm was used as the mold cavity, and pre-molded 0.5 mm thickness sheets made of polyamide 6 were placed on the both surfaces of mold cavity, to obtain an exterior molding body comprising the long fiber reinforced resin layer and non-reinforced resin layers laminated on the both surfaces thereof (maximum project area of 22500 mm²). In thus laminated tabular exterior molding body, the thickness ratio of long fiber reinforced resin layer/non-reinforced resin layers was 3. The sheet made of polyamide 6 had a cross shape print on one surface thereof. The molding was conducted by such a manner that the cross shape mark was included.

Thus obtained long fiber reinforced exterior molding body was excellent in flatness and was a high-stiffness structure. Further, the evaluation results of the fiber content, weight average fiber length, mechanical properties, linear expansion coefficient, maximum dimension change rate under condition of moisture absorption and relative viscosity for the specimen pieces cut from the molding body were shown in the following Table 3. As seen from the results, the obtained long fiber reinforced exterior molding body is very excellent in all mechanical properties, and small in all anisotropy of linear expansion coefficient, linear expansion coefficients and maximum dimension change rate under condition of moisture absorption. Therefore, the obtained long fiber reinforced exterior molding body satisfies functions required in the exterior molding body for automobiles.

TABLE 3

|  | Example 6 | Example 7 | Example 8 |
|---|---|---|---|
| Resin | PA6 | PA6 | MXD6-PA |
| Glass fiber |  |  |  |
| Content [% by weight] | 30.2 | 50.3 | 50.1 |
| Weight average fiber length [mm] | 2.99 | 2.78 | 2.58 |
| Diameter [μm] | 16 | 16 | 16 |
| Molding body |  |  |  |
| Maximum projection area [mm²] | 22500 | 22500 | 27300 |
| Relative viscosity | 2.2 | 2.2 | 2.1 |
| Narrow flow path |  |  |  |
| Cross sectional area [mm²] | — | — | — |
| Path length [mm] | — | — | — |
| Lamination |  |  |  |
| Reinforced layer/non-reinforced layer | — | — | — |
| Bending properties |  |  |  |
| Bending elastic modulus [GPa] | 6.9 | 12.5 | 15.1 |
| Bending strength [MPa] | 239 | 265 | 318 |
| Charpy impact resistance [kJ/mm²] | 24 | 31 | 29 |
| Linear expansion coefficient |  |  |  |
| Maximum value [×10⁻⁵K⁻¹] | 4.8 | 4.2 | 3.0 |
| Minimum value [×10⁻⁵K⁻¹] | 3.3 | 3.3 | 2.4 |
| Maximum value/Minimum Value (anisotropy) | 1.5 | 1.3 | 1.3 |
| Maximum dimension change rate under condition of moisture absorption (%) | 0.22 | 0.16 | 0.11 |

|  | Example 9 | Example 10 |
|---|---|---|
| Resin | PA6 | PA6 |
| Glass fiber |  |  |
| Content [% by weight] | 49.8 | 40.5 |
| Weight average fiber length [mm] | 2.23 | 2.65 |
| Diameter [μm] | 16 | 16 |
| Molding body |  |  |
| Maximum projection area [mm²] | 27300 | 22500 |
| Relative viscosity | 2.2 | 2.2 |
| Narrow flow path |  |  |
| Cross sectional area [mm²] | 90 | — |
| Path length [mm] | 45 | — |
| Lamination |  |  |
| Reinforced layer/non-reinforced layer | — | 3 |
| Bending properties |  |  |
| Bending elastic modulus [GPa] | 12.9 | 11.8 |
| Bending strength [MPa] | 270 | 240 |
| Charpy impact resistance [kJ/mm²] | 34 | 26 |
| Linear expansion coefficient |  |  |
| Maximum value [×10⁻⁵K⁻¹] | 4.8 | 4.6 |
| Minimum value [×10⁻⁵K⁻¹] | 3.0 | 3.0 |
| Maximum value/Minimum Value (anisotropy) | 1.6 | 1.5 |
| Maximum dimension change rate under condition of moisture absorption (%) | 0.28 | 0.26 |

Comparative Example 7

The same procedures as defined in Example 6 was conducted except that the fiber content was changed from 30% to 10% at the preparation of long glass fiber reinforced polyamide resin pellet to obtain a long fiber reinforced exterior molding body.

Thus obtained long fiber reinforced exterior molding body was a low-stiffness structure. Further, the evaluation results of the fiber content, weight average fiber length, mechanical properties, linear expansion coefficient and relative viscosity for the specimen pieces cut from the molding body were shown in the following Table 4. As seen from the results, although the weight average fiber length of molding body was relatively long as 2.8 mm, the mechanical properties thereof were poor. Further, the anisotropy of linear expansion coefficient (maximum linear expansion coefficient/minimum linear expansion coefficient ratio) was large as 1.9, as well as the maximum linear expansion coefficient was large as $7.0 \times 10^{-5} K^{-1}$, and the maximum dimension change rate under condition of moisture absorption was also large as 0.65%. Therefore, the obtained long fiber reinforced exterior molding body did not satisfy functions required in the exterior molding body for automobiles.

Comparative Example 8

The same procedures as defined in Example 6 was conducted except that a polyamide 6 (manufactured by Mitsubishi Engineering-Plastics Corporation, commercial name: Novaduran 1013 GH30) whose fiber content of 30% by weight was used instead of the prepared long glass fiber reinforced polyamide resin pellet to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient and relative viscosity for the specimen pieces cut from the molding body were shown in the following Table 4. As seen from the results, since the weight average fiber length of molding body was short as 0.41 mm, the impact resistance thereof was poor. Also, the maximum linear expansion coefficient was large as $7.1 \times 10^{-5} K^{-1}$ and the anisotropy of linear expansion coefficient was large as 2.2, and as well as the maximum dimension change rate under condition of moisture absorption was also large as 0.32%. Therefore, the obtained long fiber reinforced exterior molding body did not satisfy functions required in the exterior molding body for automobiles.

Comparative Example 9

Figure 7:
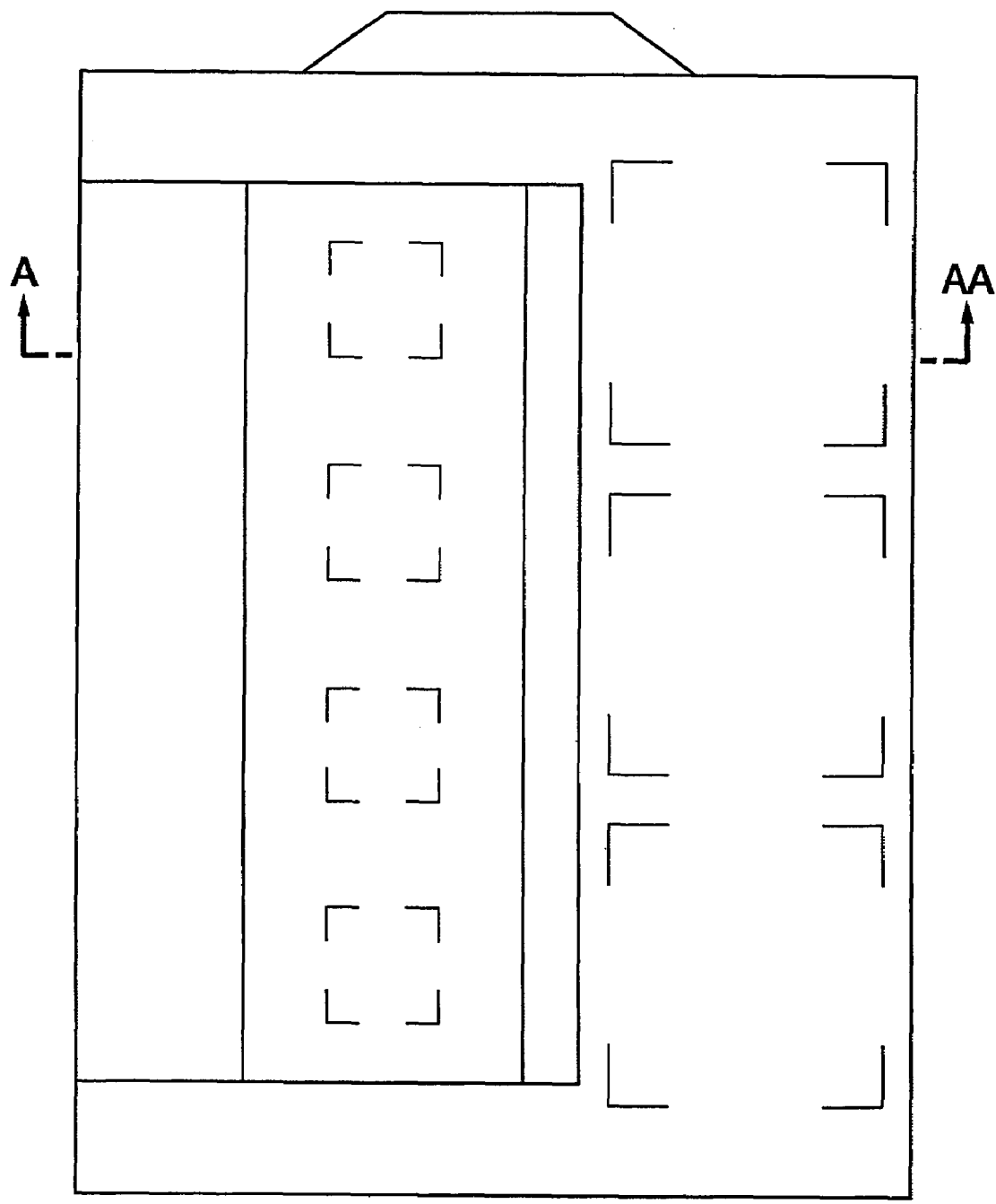
FIG. 7 is a planer view and side view of exterior molding body obtained in Comparative Example 9.
Figure 7:

The same procedures as defined in Example 7 was conducted except that at the injection molding of exterior molding body, instead of the tabular exterior molding body shown in FIG. 5, an exterior molding body which has a thickness of 3 mm, a size of 150 mm×200 mm, a notched portion, a maximum project area of 23600 mm$^2$, and a narrow flow path having a cross sectional area of 100 mm$^2$ and flow path length of 160 mm, shown in FIG. 7 was used to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient, maximum dimension change rate under condition of moisture absorption and relative viscosity for the specimen pieces cut from the molding body were shown in the following Table 4. As seen from the results, the maximum linear expansion coefficient was large as $6.0 \times 10^{-5} K^{-1}$ and the anisotropy of linear expansion coefficient was large as 2.3, and as well as the maximum dimension change rate under condition of moisture absorption was also large as 0.36%. Therefore, the obtained long fiber reinforced exterior molding body did not satisfy functions required in the exterior molding body for automobiles.

Comparative Example 10

Figure 8:
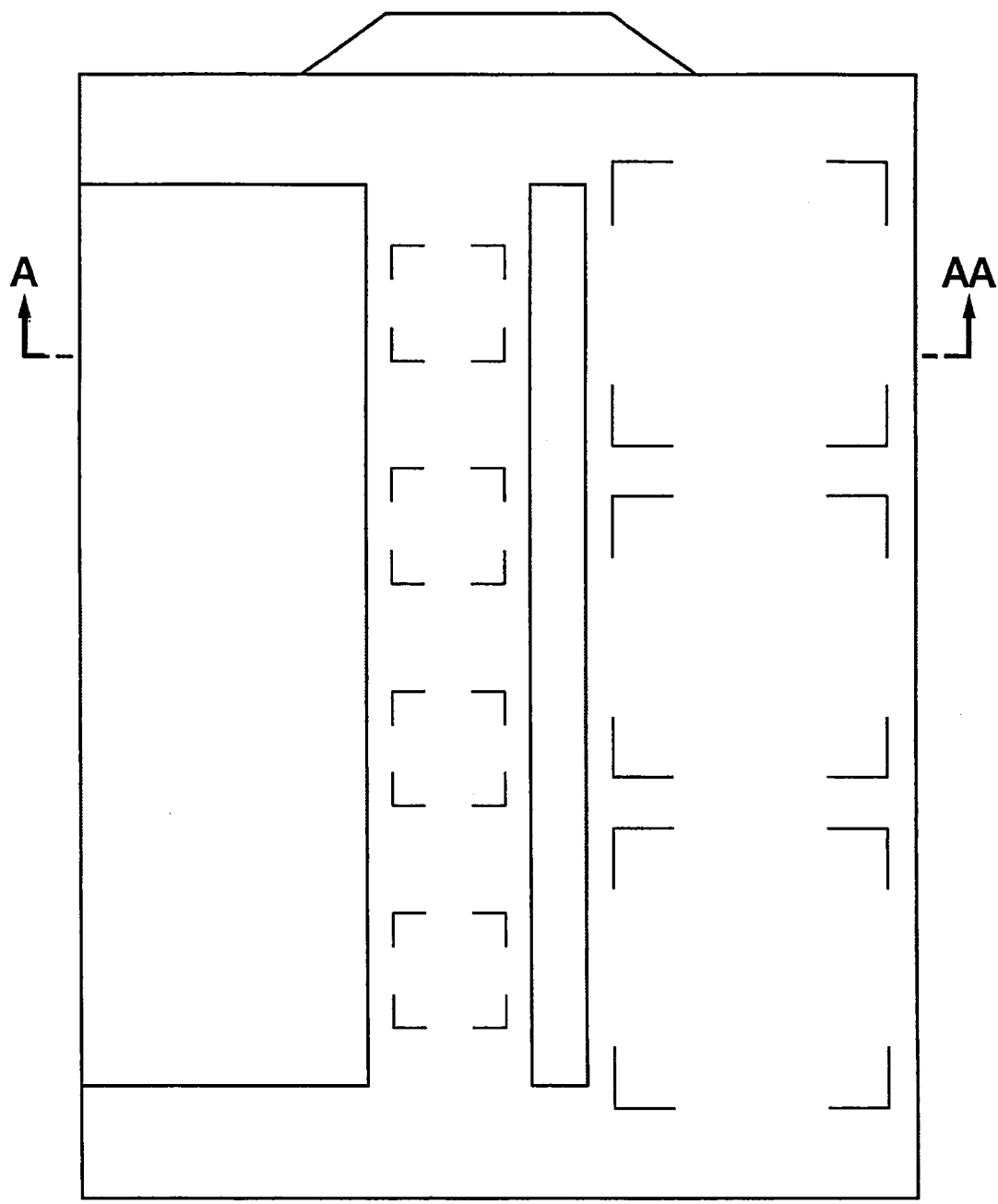
FIG. 8 is a planer view and side view of exterior molding body obtained in Comparative Example 10.
Figure 8:

The same procedures as defined in Example 7 was conducted except that at the injection molding of exterior molding body, instead of the tabular exterior molding body shown in FIG. 5, an exterior molding body which has a thickness of 3 mm, a size of 150 mm×200 mm, a notched portion, a maximum project area of 20400 mm$^2$, and a narrow flow path having a cross sectional area of 90 mm$^2$ and flow path length of 160 mm, shown in FIG. 8 was used to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient, maximum dimension change rate under condition of moisture absorption and relative viscosity for the specimen pieces cut from the molding body were shown in the following Table 4. As seen from the results, the maximum linear expansion coefficient was large as $6.5 \times 10^{-5} K^{-1}$ and the anisotropy of linear expansion coefficient was large as 3.0, and as well as the maximum dimension change rate under condition of moisture absorption was large as 0.41%. Therefore, the obtained long fiber reinforced exterior molding body did not satisfy functions required in the exterior molding body for automobiles.

Comparative Example 11

The same procedures as defined in Example 7 was conducted except that polyamide 6 (manufactured by Mitsubishi Engineering-Plastics Corporation, commercial name: Novamid 1030J, intrinsic viscosity: 4.5 dl/g) was used instead of polyamide 6 (manufactured by Mitsubishi Engineering-Plastics Corporation, commercial name: Novamid 1007J, relative viscosity: 2.2 dl/g) at the preparation of long glass fiber reinforced polyamide resin pellet to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient, maximum dimension change rate under condition of moisture absorption and relative viscosity for the specimen pieces cut from the molding body were shown in the following Table 4. As seen from the results, since the weight average fiber length of molding body was short as 0.91 mm, the impact resistance thereof was poor. Also, the maximum linear expansion coefficient was large as $6.5 \times 10^{-5} K^{-1}$ and the anisotropy of linear expansion coefficient was large as 2.0, and as well as the maximum dimension change rate under condition of moisture absorption was large as 0.32%. Therefore, the obtained long fiber reinforced exterior molding body did not satisfy functions required in the exterior molding body for automobiles.

Comparative Example 12

The same procedures as defined in Example 10 was conducted except that at the injection molding of exterior molding body, 1.1 mm thickness polyamide 6 were placed on the both surfaces of mold cavity instead of the 0.5 mm thickness sheets made of polyamide 6 to obtain an exterior molding body comprising the long fiber reinforced resin layer and non-reinforced resin layers laminated on the both surfaces thereof. In thus laminated tabular exterior molding body, the thickness ratio of long fiber reinforced resin layer/non-reinforced resin layers was 0.82.

Thus obtained long fiber reinforced exterior molding body was excellent in flatness. Further, the evaluation results of the fiber content, weight average fiber length, mechanical properties, linear expansion coefficient, maximum dimension change rate under condition of moisture absorption and intrinsic viscosity for the specimen pieces cut from the molding body were shown in the following Table 4. As seen from the results, the mechanical properties such as rigidity and mechanical strength thereof were poor. Also, the maximum linear expansion coefficient was large as $7.0 \times 10^{-5} K^{-1}$ and the anisotropy of linear expansion coefficient was large as 2.1, and as well as the maximum dimension change rate under condition of moisture absorption was large as 0.37%. Therefore, the obtained long fiber reinforced exterior molding body did not satisfy functions required in the exterior molding body for automobiles.

Comparative Example 13

The same procedures as defined in Comparative Example 8 was conducted except that an aromatic polyamide (manufactured by Mitsubishi Gas Chemical Company, Inc, commercial name: MX nylon S6121, relative viscosity: 3.65, abbreviated as MX) whose fiber content of 50% by weight was used instead of the polyamide 6 (manufactured by Mitsubishi Engineering-Plastics Corporation, commercial name: Novaduran 1013 GH30) whose fiber content of 30% by weight to obtain a long fiber reinforced exterior molding body.

Thus obtained long fiber reinforced exterior molding body was a high-stiffness structure. Further, the evaluation results of the fiber content, weight average fiber length, mechanical properties, linear expansion coefficient and relative viscosity for the specimen pieces cut from the molding body were shown in the following Table 4. As seen from the results, since the weight average fiber length of molding body was short as 0.55 mm, the impact resistance thereof was very poor. Therefore, the obtained long fiber reinforced exterior molding body did not satisfy functions required in the exterior molding body for automobiles.

TABLE 4

| | Comparative Example | | | |
|---|---|---|---|---|
| | 7 | 8 | 9 | 10 |
| Resin | PA6 | PA6 | PA6 | PA6 |
| Glass fiber | | | | |
| Content [% by weight] | 10.6 | 29.8 | 49.7 | 50.4 |
| Weight average fiber length [mm] | 2.76 | 0.41 | 2.32 | 2.41 |
| Diameter [μm] | 16 | 16 | 16 | 16 |
| Molding body | | | | |
| Maximum projection area [mm$^2$] | 22500 | 22500 | 20400 | 20400 |
| Relative viscosity | 2.2 | 2.2 | 2.2 | 2.2 |
| Narrow flow path | | | | |
| Cross sectional area [mm$^2$] | — | — | 100 | 90 |
| Path length [mm] | — | — | 160 | 160 |
| Lamination | | | | |
| Reinforced layer/non-reinforced layer | — | — | — | — |
| Bending properties | | | | |
| Bending elastic modulus [GPa] | 2.6 | 7.2 | 12.6 | 12.3 |
| Bending strength [MPa] | 102 | 250 | 260 | 270 |
| Charpy impact resistance [kJ/mm$^2$] | 10 | 10 | 33 | 30 |
| Linear expansion coefficient | | | | |
| Maximum value [×10$^{-5}$K$^{-1}$] | 7.0 | 7.1 | 6.0 | 6.5 |
| Minimum value [×10$^{-5}$K$^{-1}$] | 3.7 | 3.3 | 2.6 | 2.2 |
| Maximum value/Minimum Value (anisotropy) | 1.9 | 2.2 | 2.3 | 3.0 |
| Maximum dimension change rate under condition of moisture absorption (%) | 0.65 | 0.32 | 0.36 | 0.41 |

| | Comparative Example | | |
|---|---|---|---|
| | 11 | 12 | 13 |
| Resin | PA6 | PA6 | MX |
| Glass fiber | | | |
| Content [% by weight] | 50.1 | 25.3 | 49.5 |
| Weight average fiber length [mm] | 0.91 | 2.22 | 0.55 |
| Diameter [μm] | 16 | 16 | 16 |
| Molding body | | | |
| Maximum projection area [mm$^2$] | 22500 | 22500 | 22500 |
| Relative viscosity | 4.5 | 2.2 | 3.65 |
| Narrow flow path | | | |
| Cross sectional area [mm$^2$] | — | — | — |
| Path length [mm] | — | — | — |
| Lamination | | | |
| Reinforced layer/non-reinforced layer | — | 0.82 | — |
| Bending properties | | | |
| Bending elastic modulus [GPa] | 12.2 | 6.2 | 15.5 |
| Bending strength [MPa] | 250 | 231 | 320 |
| Charpy impact resistance [kJ/mm$^2$] | 16 | 10 | 7 |
| Linear expansion coefficient | | | |
| Maximum value [×10$^{-5}$K$^{-1}$] | 6.5 | 7.0 | 4.2 |
| Minimum value [×10$^{-5}$K$^{-1}$] | 3.2 | 3.3 | 2.8 |
| Maximum value/Minimum Value (anisotropy) | 2.0 | 2.1 | 1.5 |
| Maximum dimension change rate under condition of moisture absorption (%) | 0.32 | 0.37 | 0.12 |

What is claimed is:

1. An exterior injection molding body comprising a long fiber reinforced thermoplastic resin wherein:

the content of the long fiber dispersed in the molding body is 30 to 90% by weight, the weight average fiber length of the long fiber is 1.5 to 10 mm, the maximum project area of said molding body is not less than 20000 mm$^2$, the maximum linear expansion coefficient at a portion of said molding body having a wall thickness of not less than 2 mm is not more than $5\times10^{-5}K^{-1}$ and the ratio of maximum linear expansion coefficient/minimum linear expansion coefficient is not more than 1.8 provided that when using a mold cavity having a shape with a portion of a resin flow path in which the reinforced thermoplastic flows having not more than 100 mm$^2$ of cross sectional area is present in the mold cavity, the length of the resin flow path at said portion is not more than 150 mm.

2. An exterior injection molding body according to claim 1, wherein the thermoplastic resin is selected from the group consisting of polyester resins, aromatic polycarbonate resins, alloy of polyester resins and aromatic polycarbonate resins, and polyamide resins.

3. An exterior injection molding body according to claim 1, wherein the thermoplastic resin is a polyamide resin and the maximum dimension change rate under condition of moisture absorption at a portion of molding body having a thickness of not less than 2 mm is not more than 0.3%.

4. An exterior injection molding body according to claim 2, wherein the thermoplastic resin is such a polybutylene terephthlate resin that the intrinsic viscosity thereof measured at 30° C. in a mixed solvent of phenol and tetrachloroethane in a ratio of 1:1 by weight is 0.30 to 1.20 dl/g and the titanium content thereof is not more than 33 ppm.

5. An exterior injection molding body according to claim 2, wherein the thermoplastic resin is a polyamide 6 having a relative viscosity measured at 23° C. in a 1% solution of 98% sulfuric acid of 1.5 to 2.5.

6. An exterior injection molding body according to claim 2, wherein the thermoplastic resin is an aromatic polyamide having a relative viscosity measured at 23° C. in a 1% solution of 96% sulfuric acid of 1.5 to 2.5.

7. An exterior injection molding body according to claim 2, wherein the polyamide resin comprising as a main component an aromatic polyamide obtained from polycondensation reaction of an aromatic diamine and an aliphatic dicarboxylic acid.

8. An exterior injection molding body according to claim 1, wherein a mixture prepared from blending a recycled resin into the long fiber reinforced thermoplastic resin is used as the molding material; and the blending ratio thereof based on the weight of mixture satisfies such ranges that the weight of resin is 30 to 100% by weight and the weight of resin is 0 to 70% by weight.

9. An exterior injection molding body according to claim 8, wherein the long fiber reinforced thermoplastic resin is selected from polyester resins, aromatic polycarbonate resins or alloys thereof; and the recycled resin is a recycled product of aromatic polycarbonate resin having a viscosity average molecular weight of 10000 to 17000.

10. An exterior injection molding body according to claim 8, wherein the long fiber reinforced thermoplastic resin is a polyamide resin; and the recycled resin is at least one selected from the group consisting of polypropylene, polyethylene, polystyrene and acrylonitrile-styrene-butadiene copolymer.

11. An exterior injection molding body according to claim 1, wherein the long fiber for reinforcing is a glass fiber having a diameter of 10 to 20 μm.

12. An exterior injection molding body according to claim 1, which is used for exterior injection molding bodies for automobiles selected from the group consisting of bonnet, roof, hood, front panel, canopy, trunk lid, door panel, pillar, and exterior panel or structured body for automobiles.

13. An exterior injection molding body according to claim 12, wherein at least one non-reinforced resin layer is laminated on the outside surface of said exterior molding body, and the layer thickness ratio of long fiber reinforced layer and non-reinforced resin layer in a section vertical to the laminate face is not less than 1.0.

14. An exterior injection molding body according to claim 13, wherein the non-reinforced resin is a same kind of resin as the resin constituting the long fiber reinforced thermoplastic resin or an alloy thereof as a main component.

15. An exterior injection molding body according to claim 13, wherein when laminating, a decoration part comprising characters, emblems and/or marks is enclosed between the long fiber reinforced layer and the non-reinforced resin layer.

* * * * *